Nov. 28, 1939. O. F. SMETANA 2,181,836
FULL FASHIONED STOCKING
Filed May 9, 1935 20 Sheets-Sheet 2
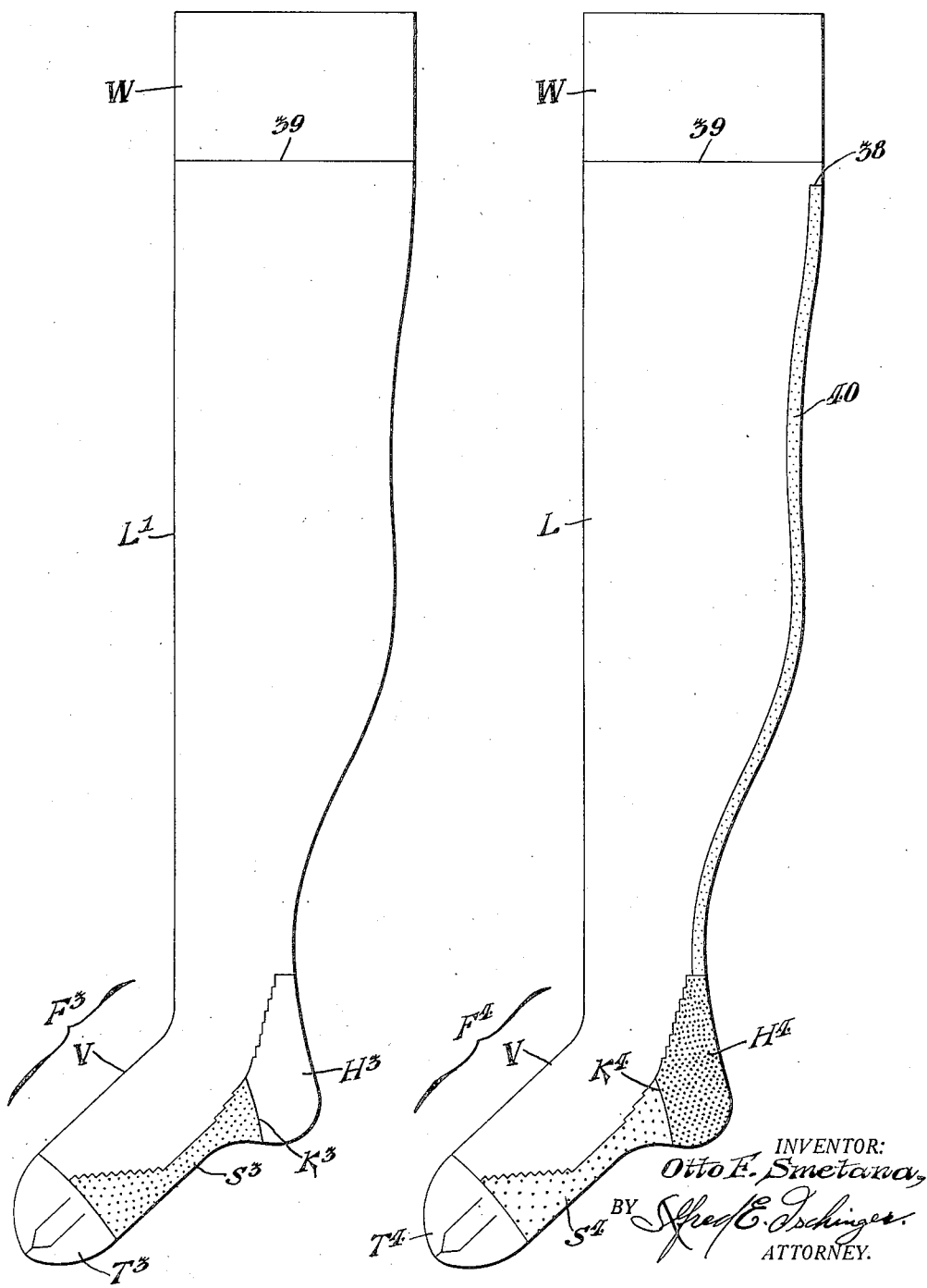

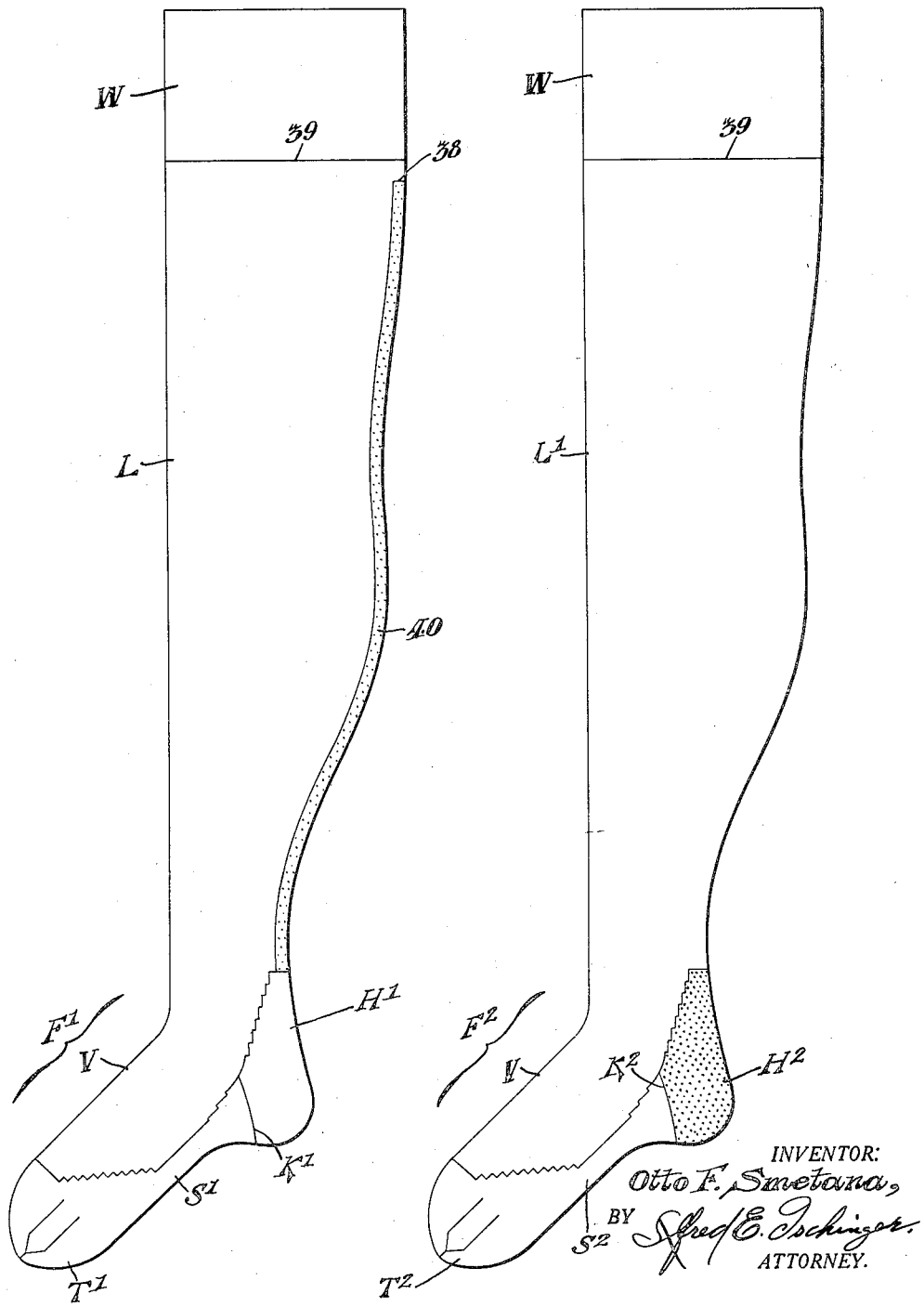

Nov. 28, 1939.  O. F. SMETANA  2,181,836
FULL FASHIONED STOCKING
Filed May 9, 1935  20 Sheets-Sheet 3

INVENTOR:
Otto F. Smetana,
BY *[signature]*
ATTORNEY.

INVENTOR:
Otto F. Smetana,
BY
ATTORNEY.

Nov. 28, 1939.    O. F. SMETANA    2,181,836
FULL FASHIONED STOCKING
Filed May 9, 1935    20 Sheets-Sheet 5

INVENTOR:
Otto F. Smetana,
BY
ATTORNEY.

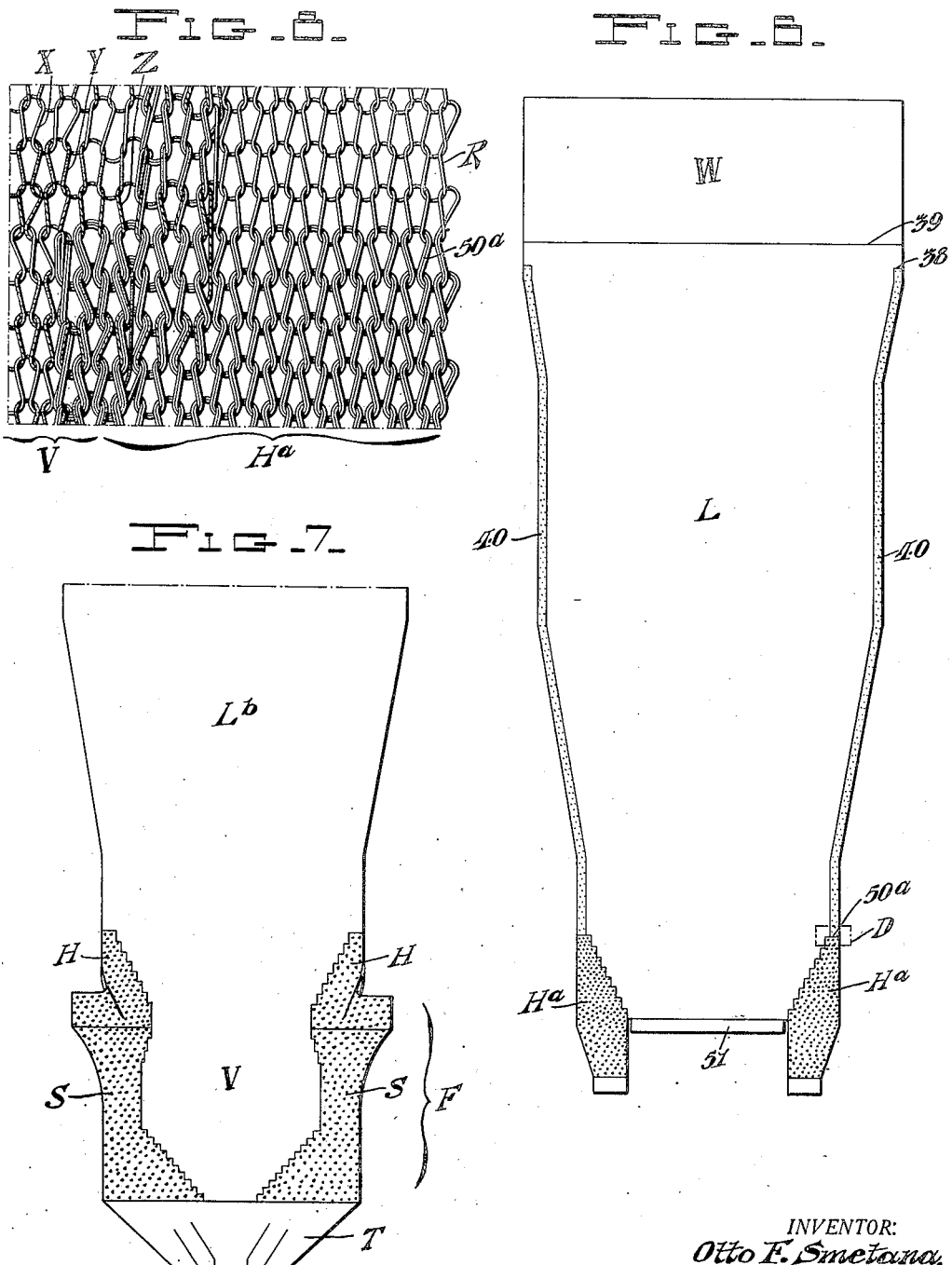

Nov. 28, 1939.   O. F. SMETANA   2,181,836
FULL FASHIONED STOCKING
Filed May 9, 1935   20 Sheets-Sheet 7

INVENTOR:
Otto F. Smetana,
BY Alfred E. Ischinger
ATTORNEY.

Nov. 28, 1939.  O. F. SMETANA  2,181,836
FULL FASHIONED STOCKING
Filed May 9, 1935  20 Sheets-Sheet 8
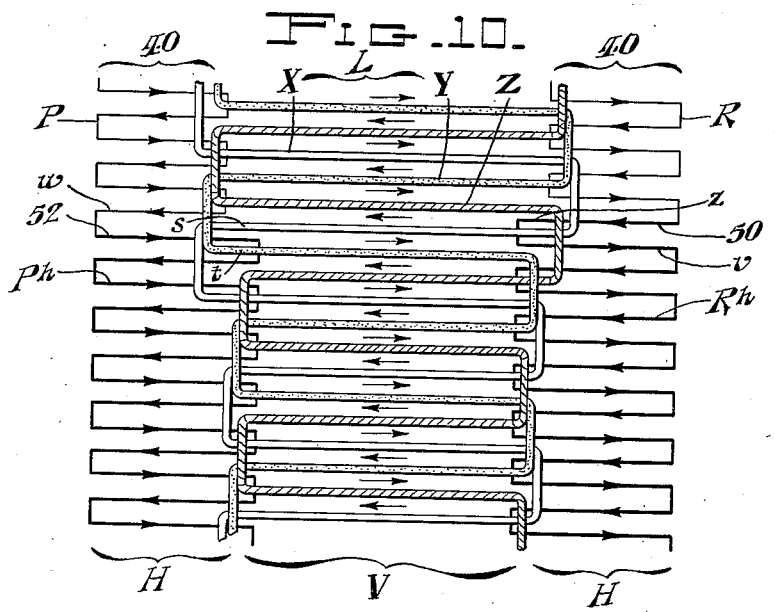
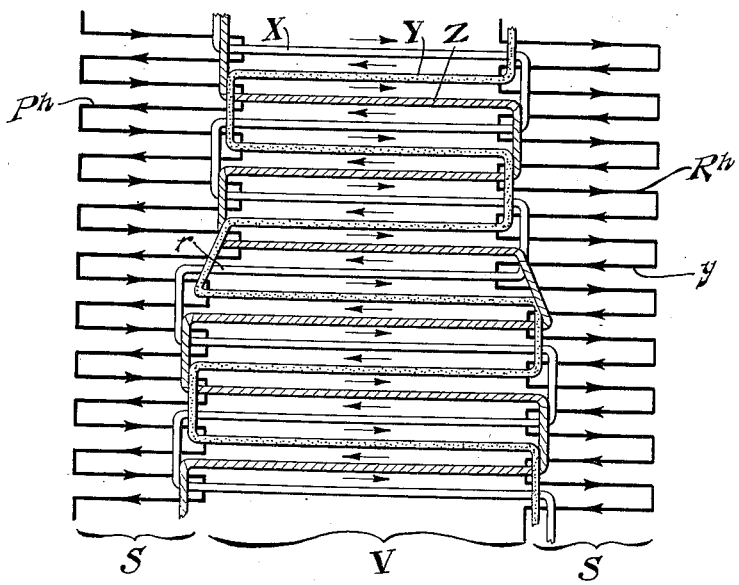
INVENTOR:
Otto F. Smetana,
BY Alfred E. Tschinger
ATTORNEY.

Nov. 28, 1939.    O. F. SMETANA    2,181,836
FULL FASHIONED STOCKING
Filed May 9, 1935    20 Sheets-Sheet 9
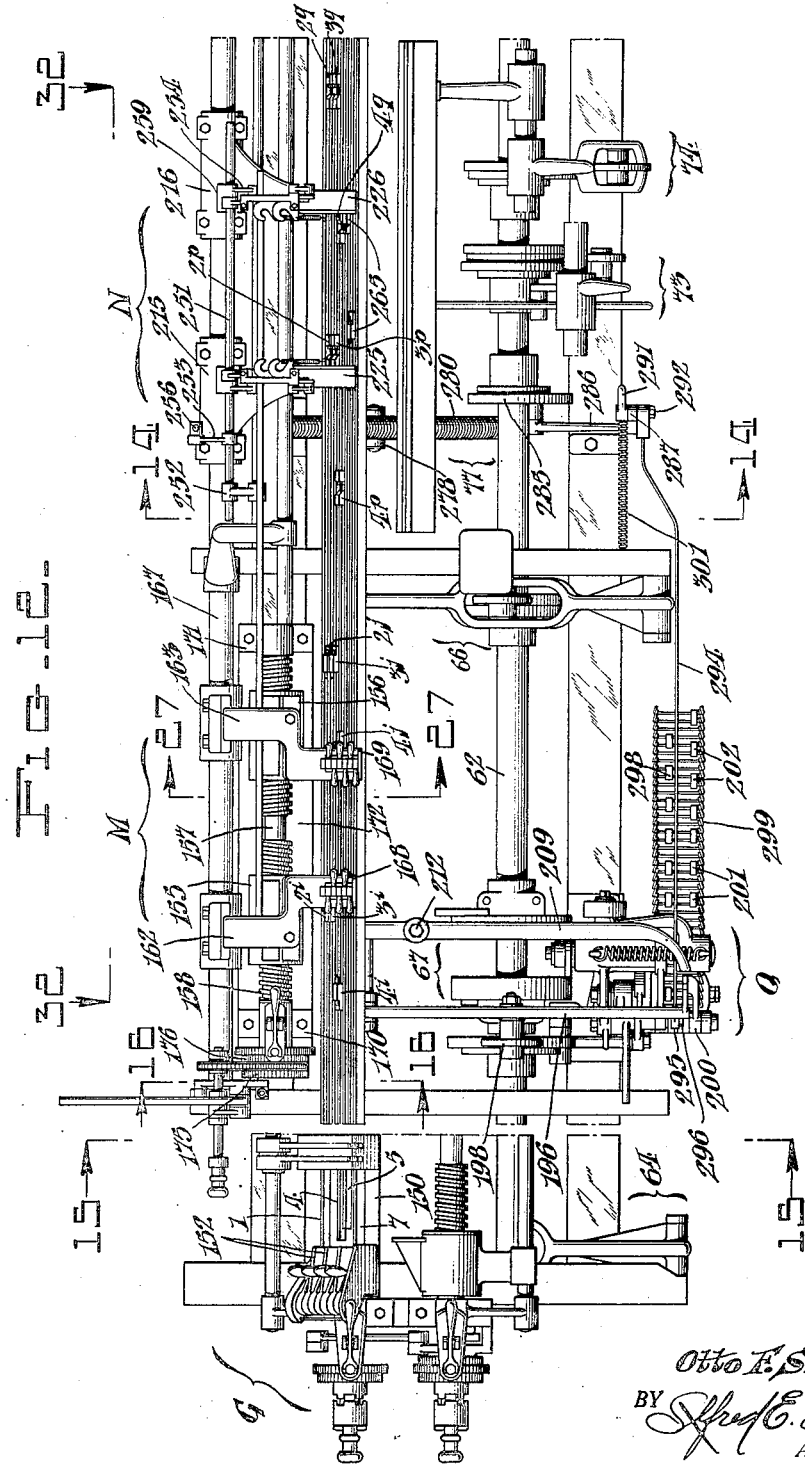
INVENTOR:
Otto F. Smetana,
BY Alfred E. Ischinger
ATTORNEY.

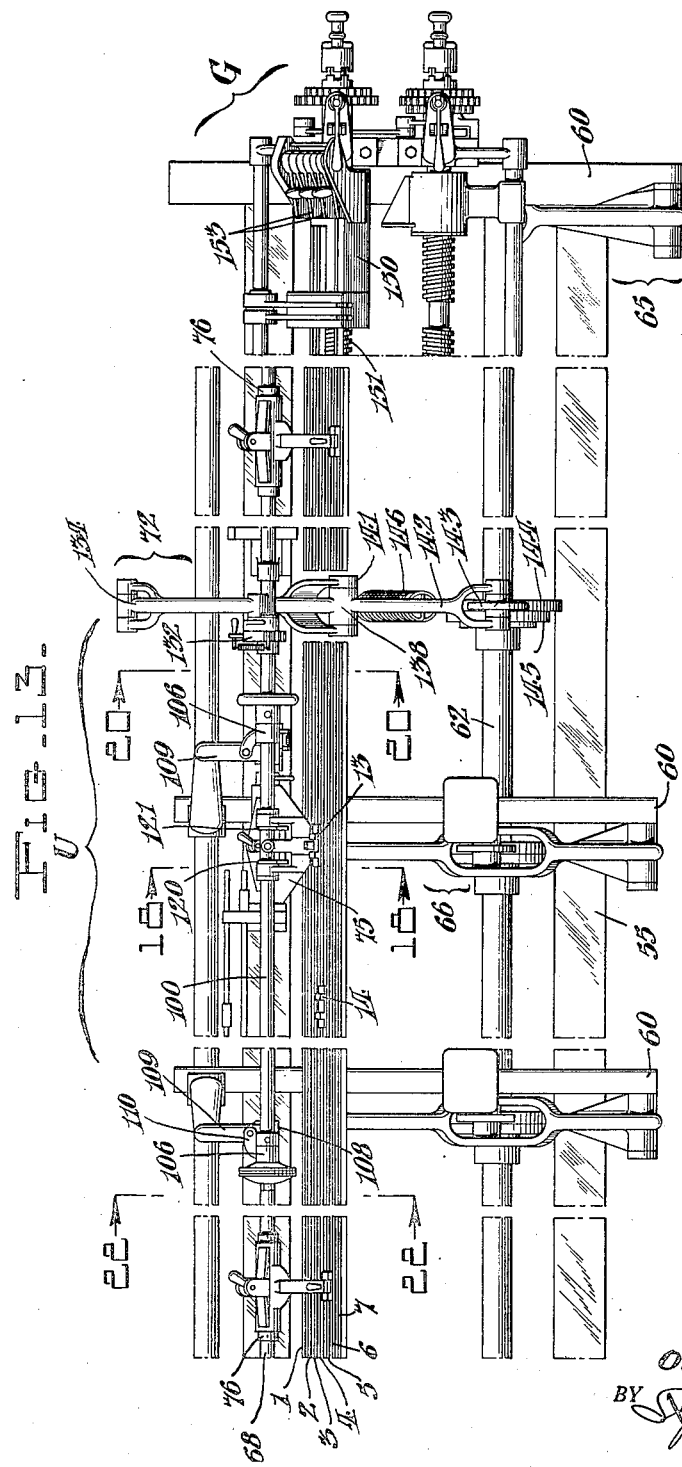

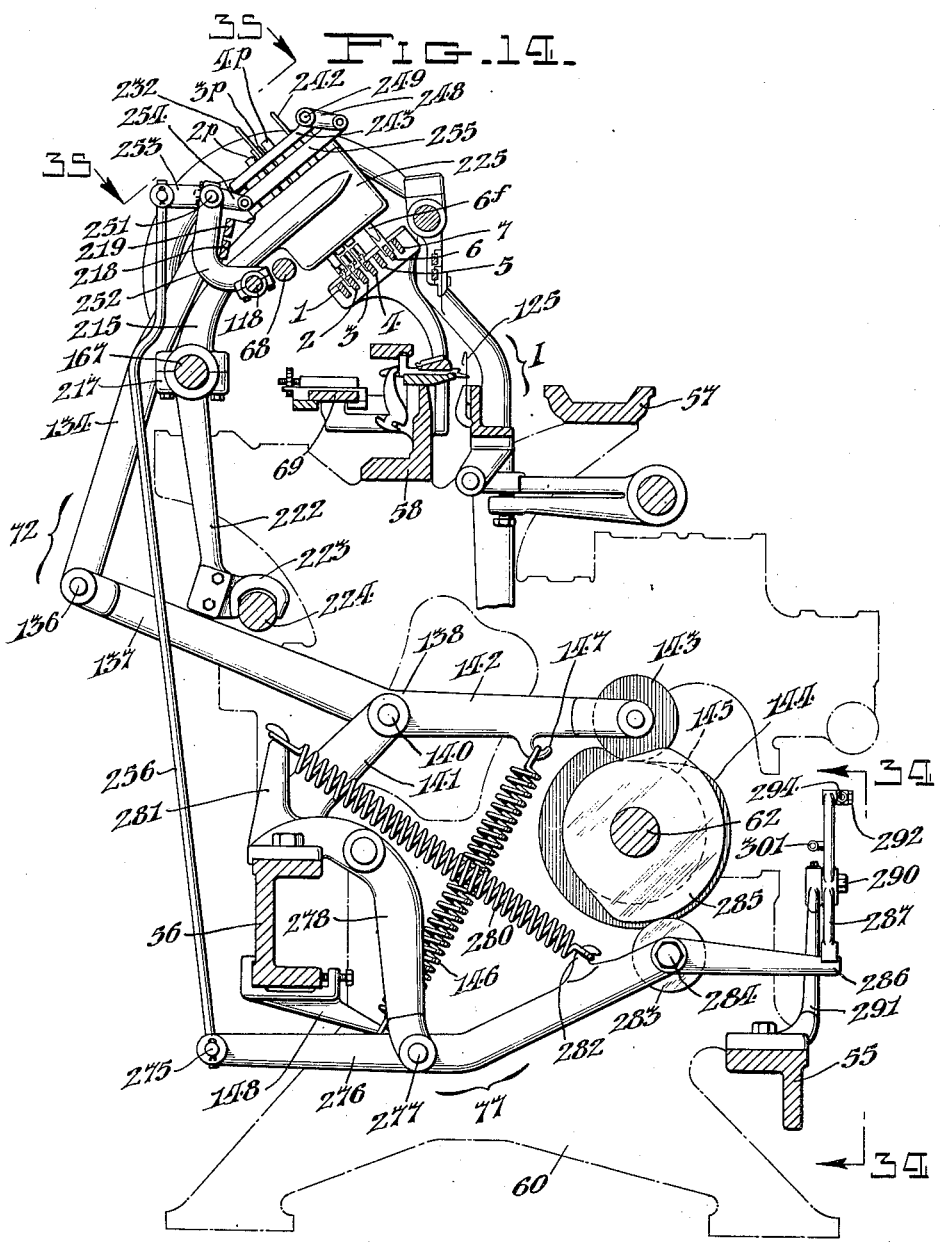

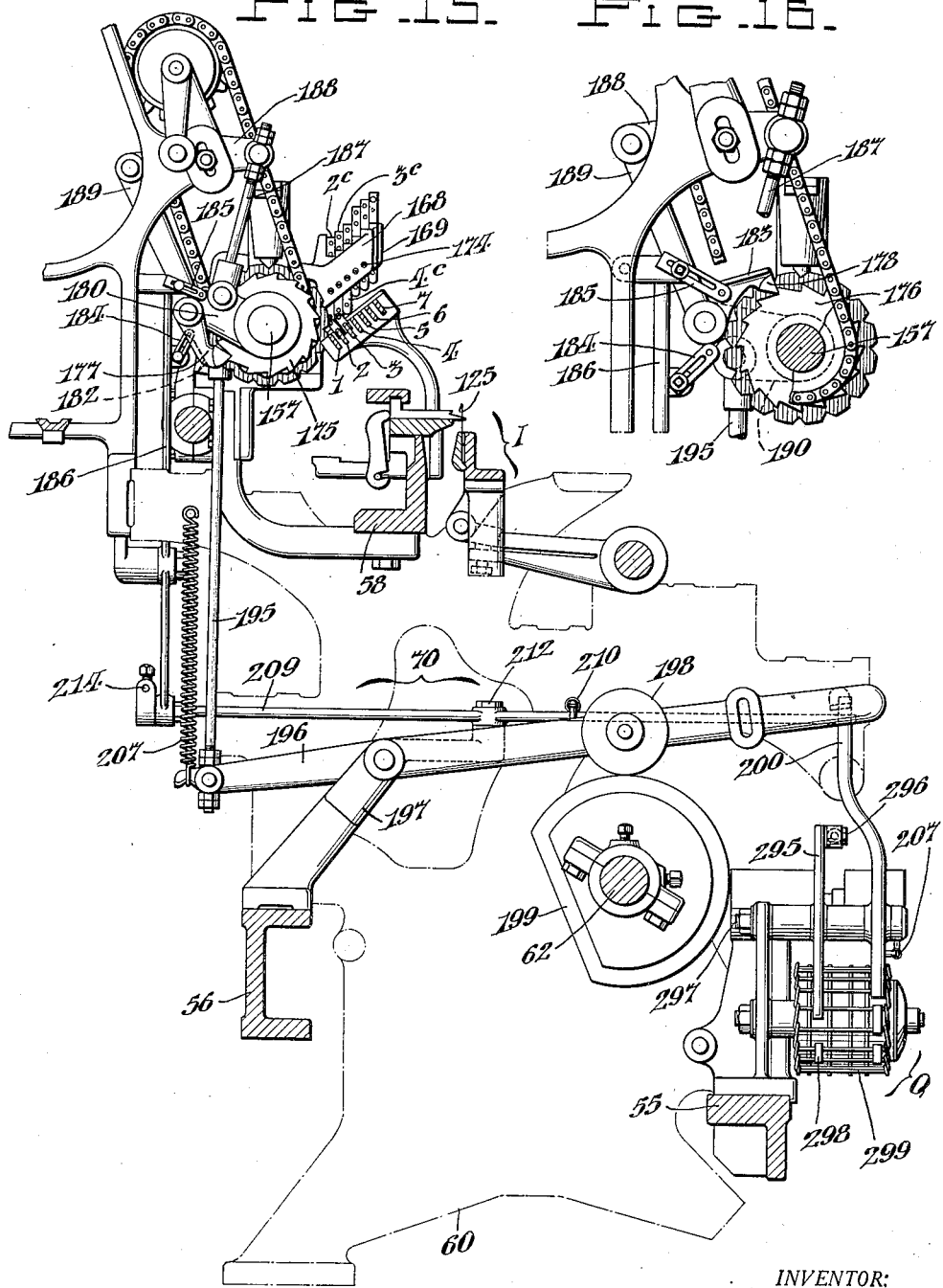

Nov. 28, 1939.   O. F. SMETANA   2,181,836
FULL FASHIONED STOCKING
Filed May 9, 1935   20 Sheets-Sheet 13
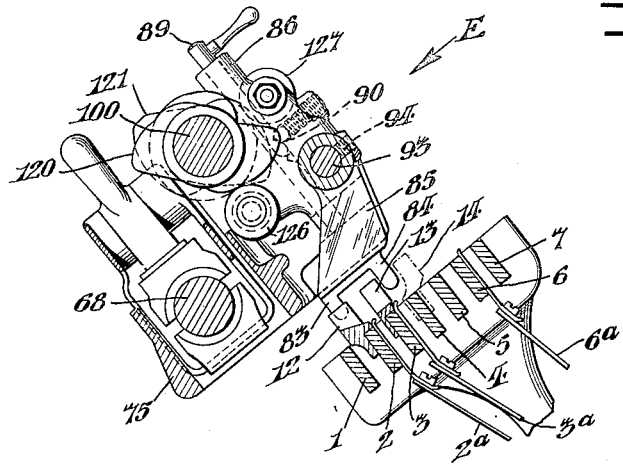
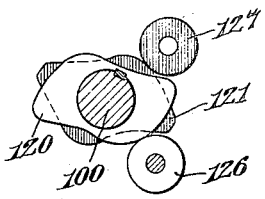
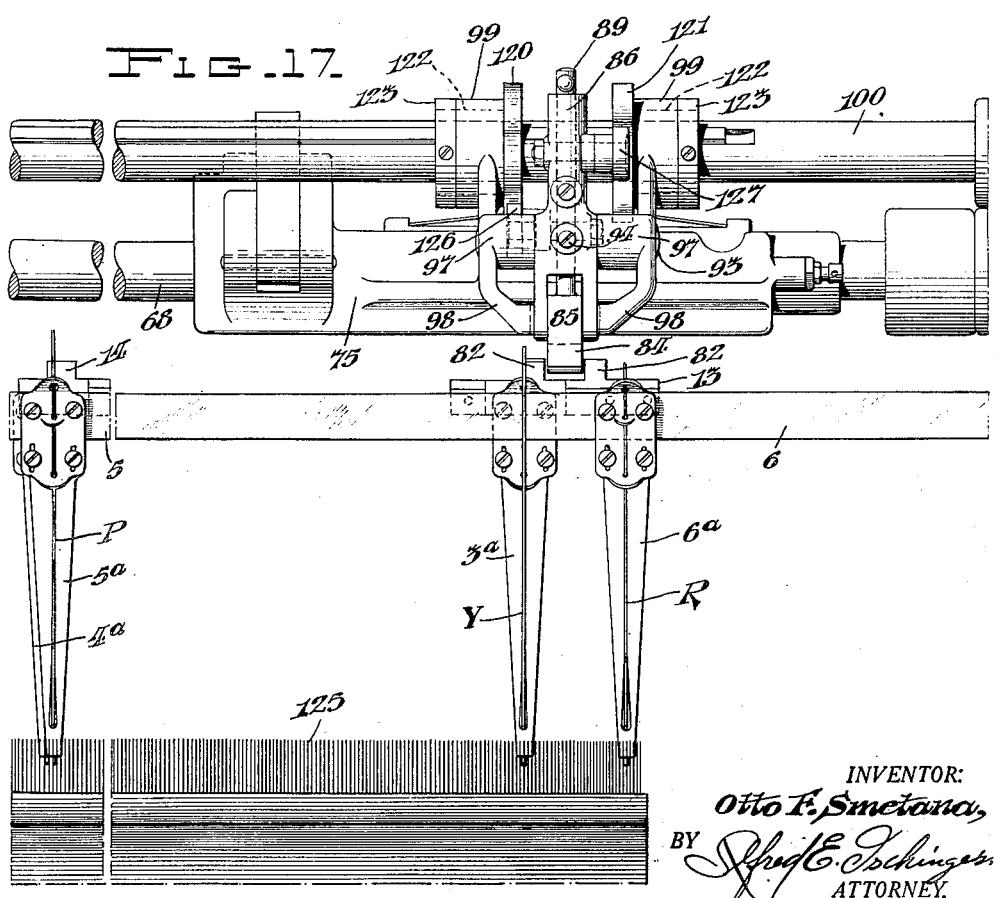
INVENTOR:
Otto F. Smetana,
BY
ATTORNEY.

Nov. 28, 1939.  O. F. SMETANA  2,181,836

FULL FASHIONED STOCKING

Filed May 9, 1935  20 Sheets-Sheet 14

INVENTOR:
Otto F. Smetana,
BY *Alfred E. Ischinger*
ATTORNEY.

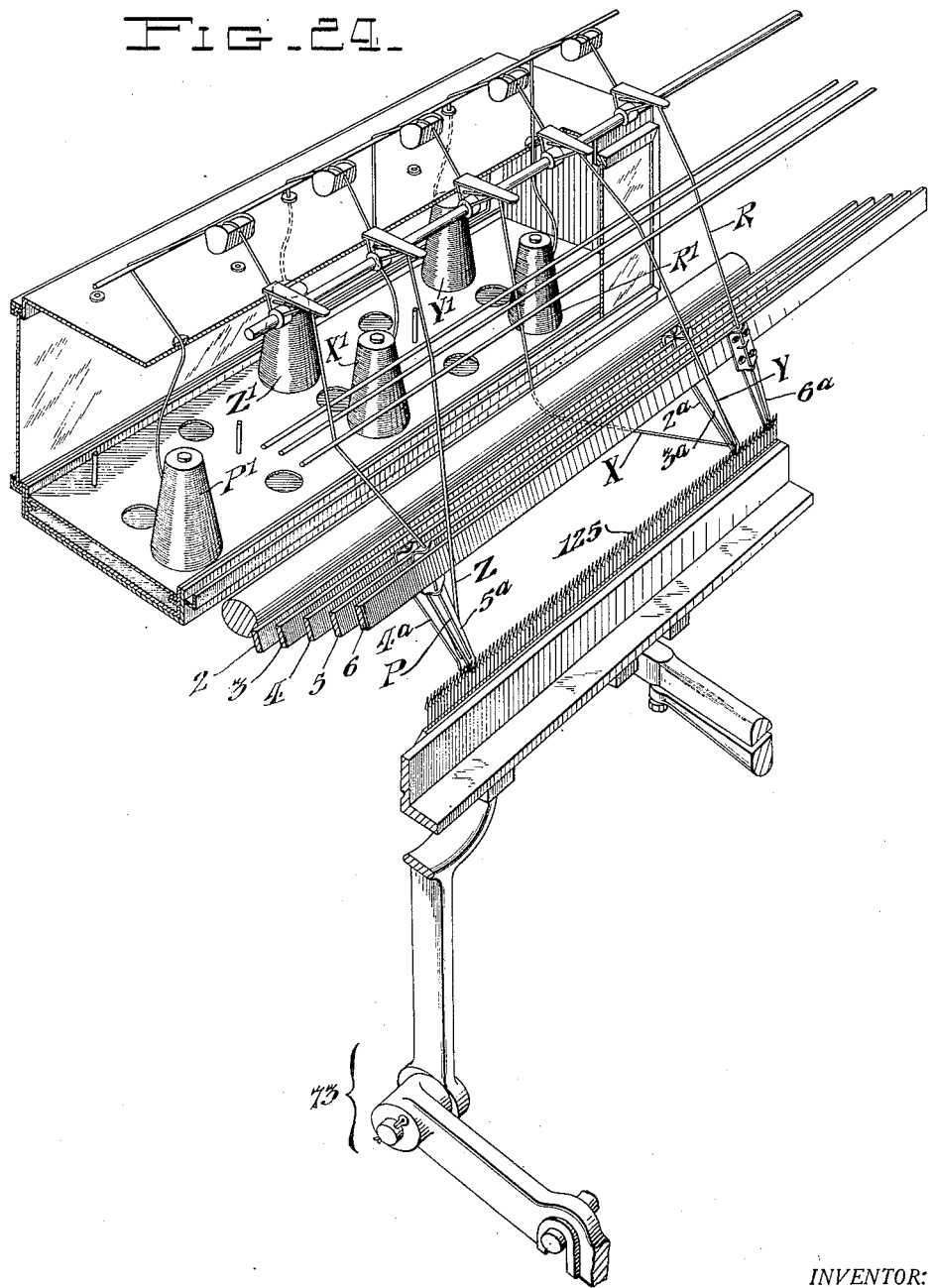

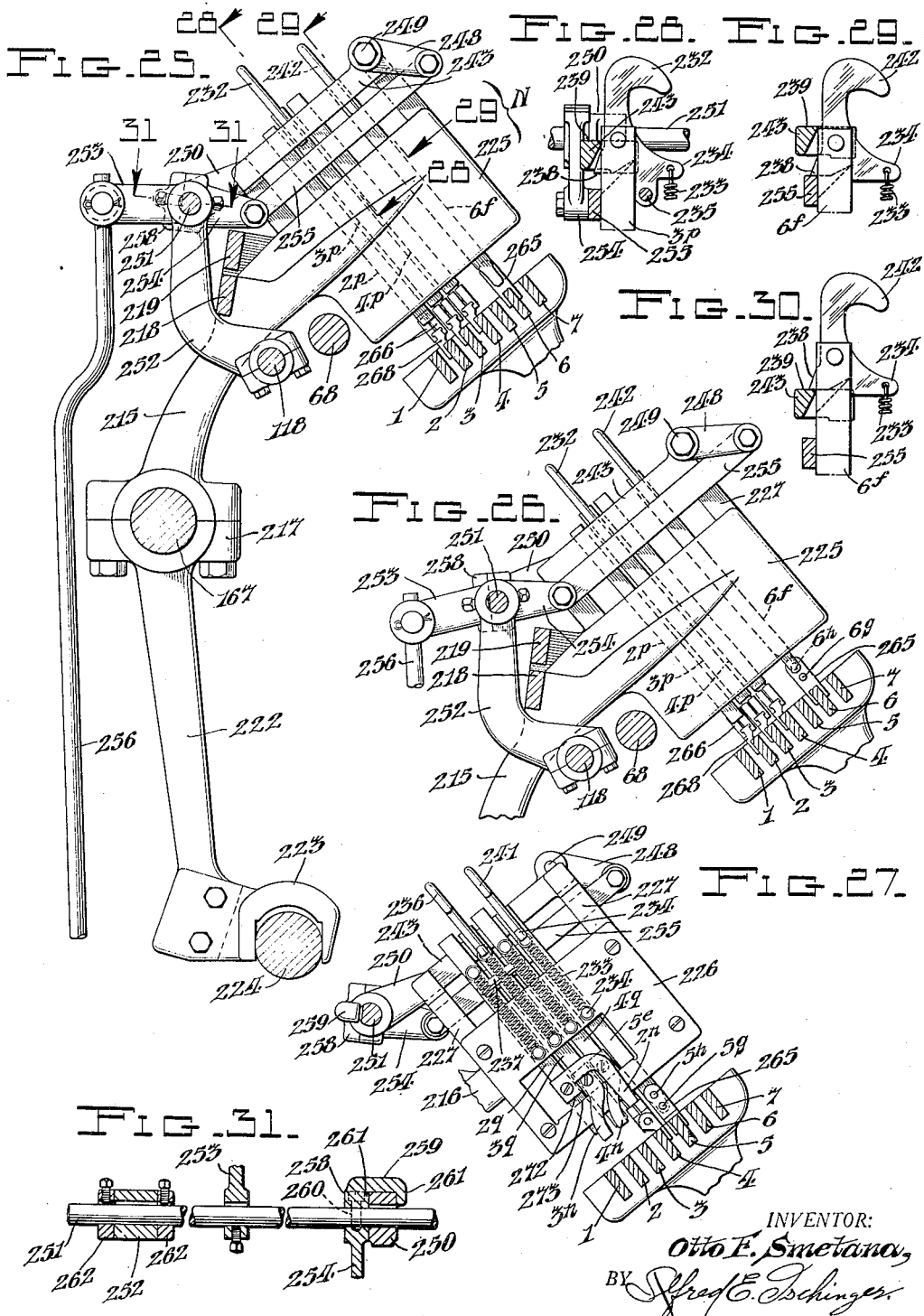

Nov. 28, 1939.  O. F. SMETANA  2,181,836
FULL FASHIONED STOCKING
Filed May 9, 1935    20 Sheets-Sheet 17
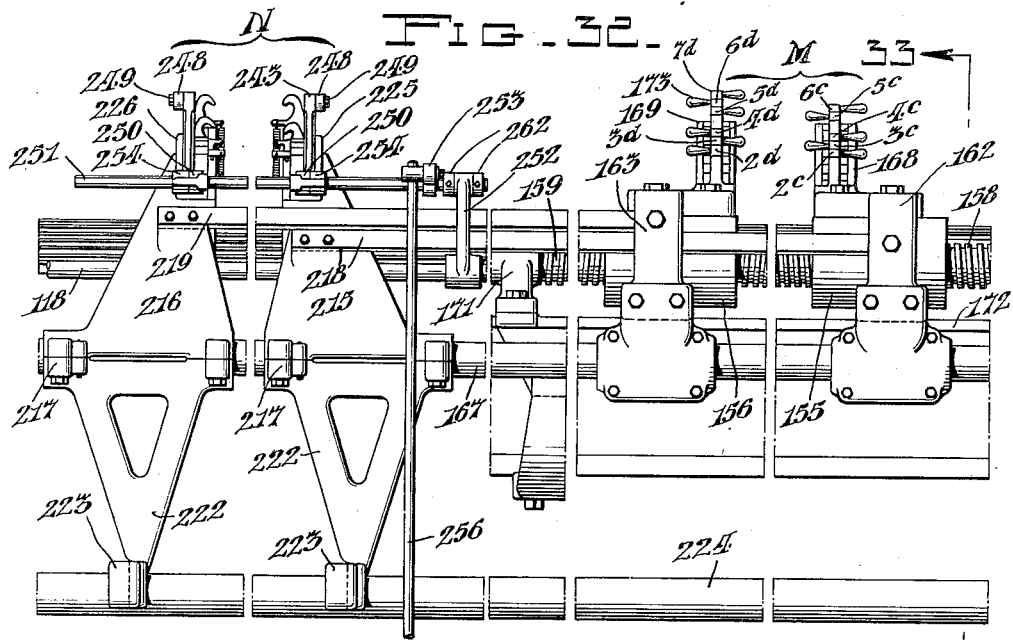
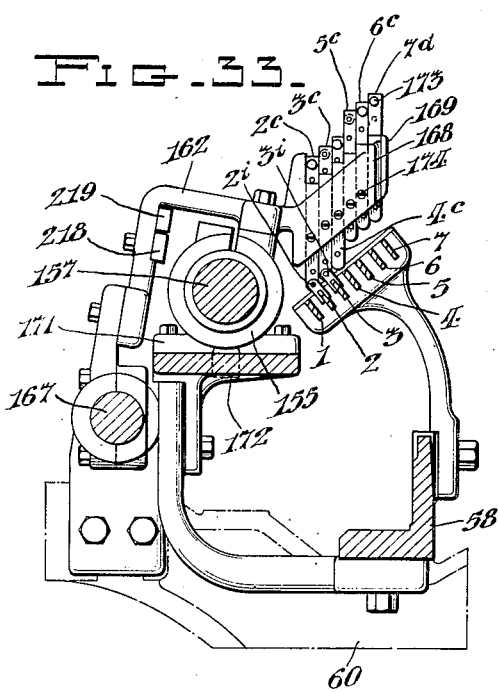
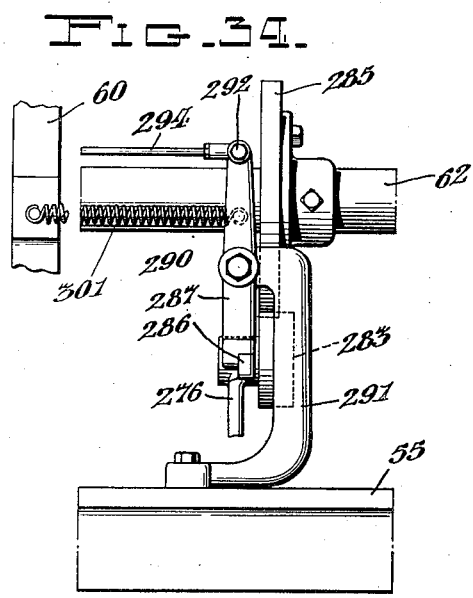
INVENTOR:
Otto F. Smetana,
BY Alfred E. Ischinger
ATTORNEY.

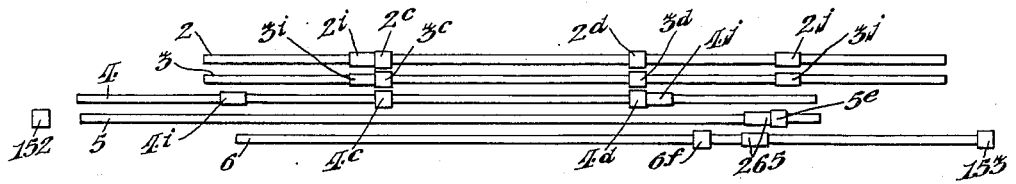
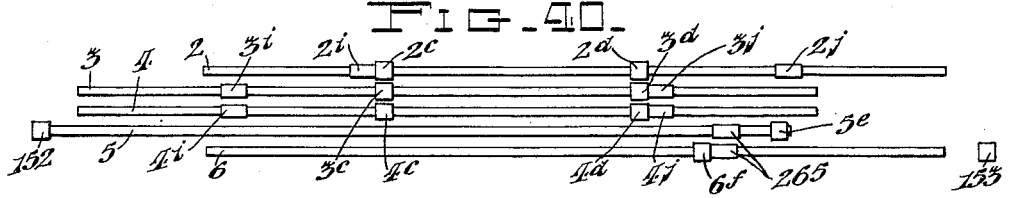
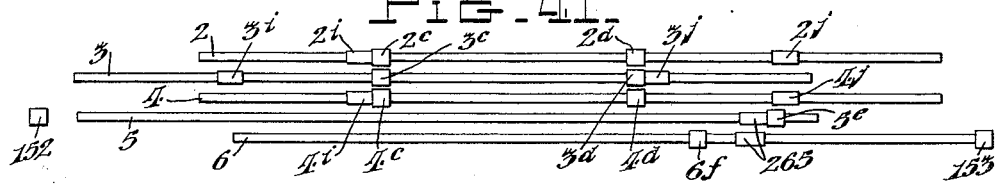

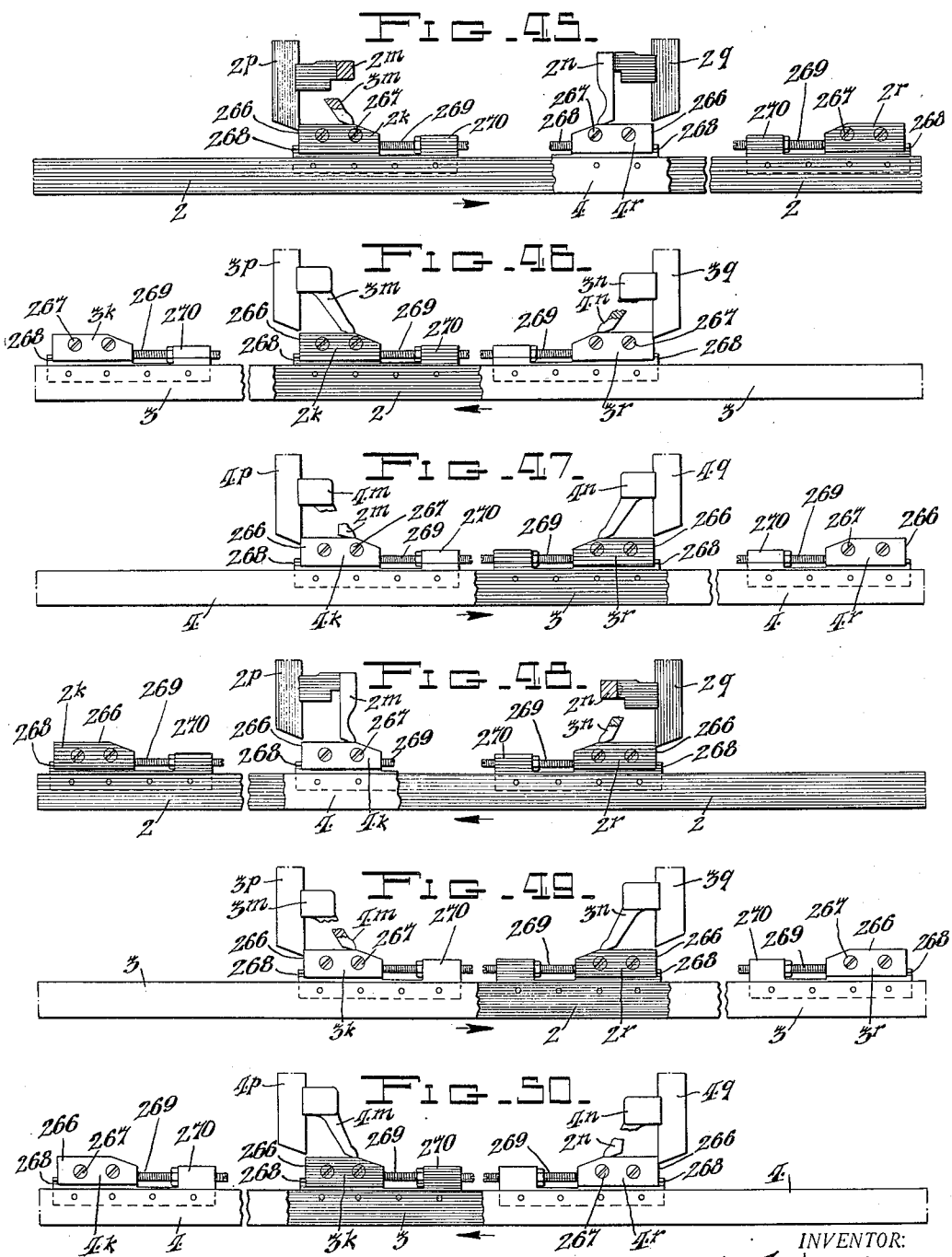

Patented Nov. 28, 1939

2,181,836

UNITED STATES PATENT OFFICE

2,181,836

FULL FASHIONED STOCKING

Otto F. Smetana, Philadelphia, Pa., assignor to Quaker Hosiery Company, Philadelphia, Pa., a corporation of Pennsylvania Application May 9, 1935, Serial No. 20,541

2 Claims. (Cl. 66—178)

My invention relates to knitted fabrics, and to the method of, and a mechanism for, producing the same, and particularly to such fabrics, method and means in relation to full-fashioned stockings for providing novel selvedge-edge and reinforcing areas.

It has been suggested to knit silk fabrics, especially full-fashioned stockings, by laying successive courses in repeated sequence from a plurality of cones of like thread, to avoid the so-called "rings" or "shadows", heretofore resulting from knitting the stockings from a single silk body thread of non-uniform gauge or evenness. By so knitting from a plurality of threads, preferably three, the better average texture of the now well-known "ringless" stocking is obtained.

However, by reason of the fact that each thread is fed across the fabric only in every third course, the threads floated across the selvedge from course to course of any one thread are naturally longer than in a similar fabric knitted from a single thread in a usual manner. The selvedge-edge loops of a ringless fabric are therefore, undesirable, in certain aspects, by reason of their size, or from the overlapping relation thereof to each other, or from a combination of the increased size and overlapping relation, rendering a substantial bulk of the edge threads loose and irregular, and likely to bunch in undesirable manner. The latter feature is particularly undesirable in the leg seam of a stocking which, by reason of the above-mentioned features, is difficult to sew or seam and to render smooth and even.

It accordingly is among the objects of the invention to avoid the above-mentioned objections, and to provide a "ringless" fabric that is not only easier to produce, but is of better texture, of appreciably enhanced appearance, and, where employed as wearing apparel, as in a stocking, has advantages of reduced bulk and better comfort, particularly at the position of seams.

It is another object to provide a facile and economical method of producing the fabric, and a mechanism for practicing the method that shall be simple and durable in construction, economical to manufacture, effective in its operation, adapted to existing knitting machines, and have other advantages.

Further, in the foot portion of a stocking, especially of the full-fashioned type, it has also been usual, in the manufacture of the above-mentioned "ringless" stocking, to superpose reinforcing areas on the three-carrier layer. That is, it has been usual to cause the three sequentially reciprocating yarn-carriers to traverse an entire area, and to have single-thread plating carriers simultaneously traverse parts of the same area, such that certain edges of the multiple-thread body fabric and the single-thread plating area come together in a more or less loose and irregular manner, as above set forth in connection with the leg seam. The objection to this formation in the foot is somewhat similar to that of the leg seam from the standpoint of appearance and other factors, and, by reason of the double-fabric thickness and the still greater thickness along the seam at the sole of the foot, of much greater objection from the standpoint of comfort to the wearer.

It accordingly is another object of the invention to overcome such objections and to provide a ringless stocking with foot portions of materially enhanced appearance, comfort of construction and other advantages.

The invention, in the feature wherein a fabric of the multiple sequential-yarn type is connected, as by a split seam, to a fabric of another kind, provides an increased selection of yarn for adjoining areas, as that such areas may be of threads of different number, gauge, texture and weight, conserves silk, provides for entirely different and better seam and foot portions in a stocking, permits the substitution of other materials in areas where the employment of silk has heretofore been unavoidable, and has other advantages.

In knitting a full fashioned stocking to have a "ringless" main body fabric, and single-thread selvedge-edge areas at opposite edges thereof, each selvedge carrier operates to lay a course during the laying of each course in the body. Since the latter is knitted by three carriers operating in sequence, there are always two of the three carriers resting against corresponding stops at the inoperative positions of the carriers. Thus, while the latter carriers are idle against the stops thereof, if the impact of the selvedge carriers against the selvedge-carrier stops is transmitted to the main carriers, the idle carriers may be jarred out of position to cause improper operation of the machine, a defective fabric, and sometimes damage to the machine.

It accordingly, is another object of the invention to avoid these objections, and to provide a mechanism of the kind specified in which the carriers forming the "ringless" fabric, and the carriers forming the selvedge portions therefor, operate in effective cooperation without disruption from effects from forces transmitted between interrelated stops.

Other objects include the provision of various novel feaures for the machine, such as interchangeable detents on the carriers for the stops, means for selectively moving a stop or stops independently of others, separate carriages for certain stops, means for selectively connecting and releasing certain carriers relative to actuating means therefor, means for moving one carriage through the intermediary of another, means for preventing binding of a member relative to a rod on which it is mounted for turning therewith and sliding therealong, means for preventing the imposition of certain carriage-moving forces on elements operable thereon, a stop holding bridge and guide, a single handle for simultaneously lifting the sequentially operable carrier stops, mechanism for holding and releasing the sequential carriers, as selected for connection to the actuating means therefor, an adjustable detent structure, and other elements singly or in combination.

With these and other objects in view, which will become apparent from the following detailed description of the illustrative embodiments of the invention shown in the accompanying drawings, my invention resides in the novel elements of construction, mechanism, and combination of parts in cooperative relationship, as hereinafter more particularly pointed out in the claims.

In the drawings:

Figure 1 is a side elevational view of a full-fashioned stocking, in the flat form, of one embodiment of the invention;

Figs. 1A, 1B and 1C are views, similar to Fig. 1, of other forms of stockings embodying the invention;

Fig. 6 is a view of another modified form of a stocking-leg blank of the invention;

Fig. 7 is a view of a further modified form of a portion of a stocking blank of the invention;

Fig. 8 is an enlarged detail view of the fabric located in an area indicated by the broken-line rectangle D of Fig. 6;

Figs. 10 and 11 are diagrams of the order in which the selvedge and body threads are laid during the shortening and lengthening, respectively, of the body threads at certain parts of the stocking;

Fig. 12 is a top-plan view of a multi-section full-fashioned knitting machine, showing substantially the left-hand half of the machine, as viewed from the front;

Fig. 13 is a top-plan view, complementary to Fig. 12, of the right-hand half of the machine;

Fig. 14 is an enlarged view, taken substantially along the line 14—14 of Fig. 12, showing portions of the machine in front-to-back section and others in elevation;

Fig. 15 is a view similar to Fig. 14, taken substantially along the line 15—15 of Fig. 12;

Fig. 16 is a slightly enlarged end view in elevation, partly broken away, of certain parts of the machine taken substantially along the line 16—16 of Fig. 12;

Fig. 17 is a view, in front elevation, taken substantially in the direction of an arrow E of Fig. 18;

Fig. 18 is a view, taken substantially along the line 18—18 of Fig. 13, of a mechanism for selectively connecting certain carrier rods to, and disconnecting them from, the friction rod carrier drive means;

Fig. 19 is a detail view of certain cam members shown in Fig. 18;

Fig. 24 is a fragmentary perspective view, illustrating, inter alia, certain of the yarn-carrier rods of the knitting machine, as set up with other parts for drawing yarns from several cones and laying them in sequence to a knitting section;

Fig. 25 is an enlarged detail view of parts as shown at the upper left-hand portion of Fig. 14;

Fig. 26 is a view similar to the upper portion of Fig. 25, showing a different operative relation of the parts;

Fig. 27 is a view taken substantially along the line 27—27 of Fig. 12;

Figure 35:
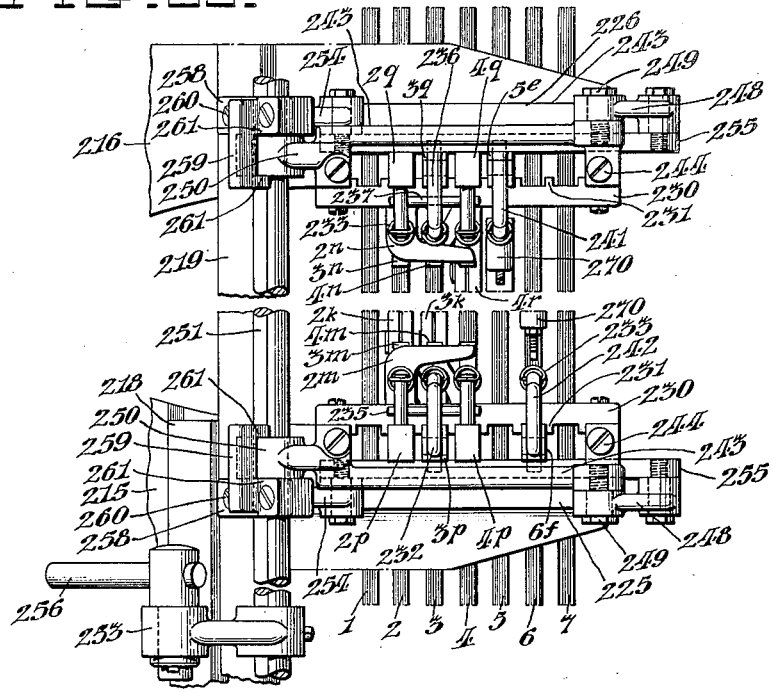
Figure 36:
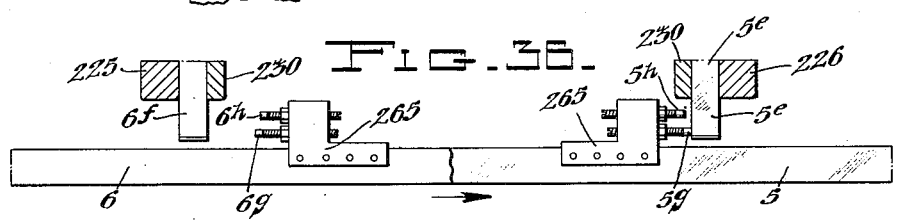
Figure 37:
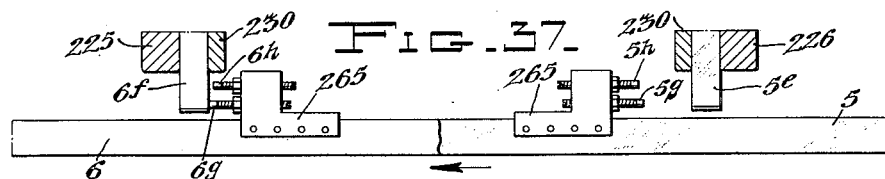
Figure 38:
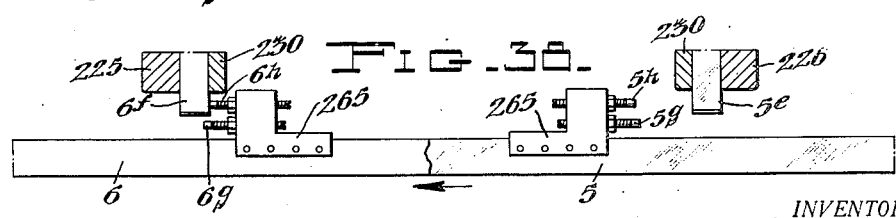

Figs. 28 and 29 are views, taken substantially along the lines 28—28 and 29—29, respectively, of Fig. 25;

Fig. 30 is a view similar to Fig. 29, showing different positions of the parts thereof;

Fig. 31 is a view taken substantially along the line 31—31 of Fig. 25;

Fig. 32 is a view taken substantially along the line 32—32 of Fig. 12;

Fig. 33 is a view taken substantially along the line 33—33 of Fig. 32;

Fig. 34 is a view taken substantially along the line 34—34 of Fig. 14;

Fig. 35 is a view taken substantially along the line 35—35 of Fig. 14;

Figs. 36, 37 and 38 are similar structural diagrammatic views showing parts of selvedge-edge carrier stop mechanism in positions assumed during successive steps of operation;

Figs. 39 to 44, inclusive, are diagrams of both the "selvedge" and "ringless" carriers and stops in successive stages of operation; and Figs. 45 to 50, inclusive, are similar structural diagrams, indicating portions of the "ringless" carrier rods and associated parts in successive operative positions.

Figure 1D:
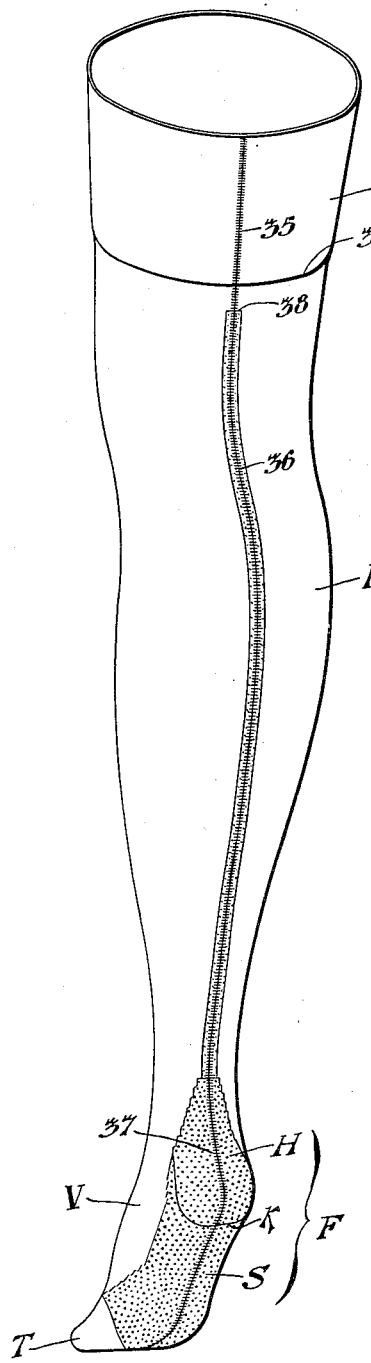
Fig. 1D is a rear perspective view of a full-fashioned stocking of another modified form and constructed in accordance with the invention.

The stocking of Fig. 1D comprises a welt W, which may be of the single web or folded-type, and knitted from silk or other material, the same as the leg, or from cotton or other material differing from the material of the leg, for various purposes, such as wear, appearance, economy of manufacture, etc. A leg L, preferably of silk, merges into, and is fashioned toward, a foot F having an instep V, preferably of the same material as the leg body, and has reinforced heel-tab, sole and toe portions H, S and T, respectively, of like or other material, in this case preferably of heavier gauge thread, the toe portion being of double thread. A single seam therefore, has like portions 35, 36 and 37 between portions of different character in the welt, the leg and the foot, respectively, as will herein more fully appear. The heel is joined to the sole by suture seams K.

Figure 2:
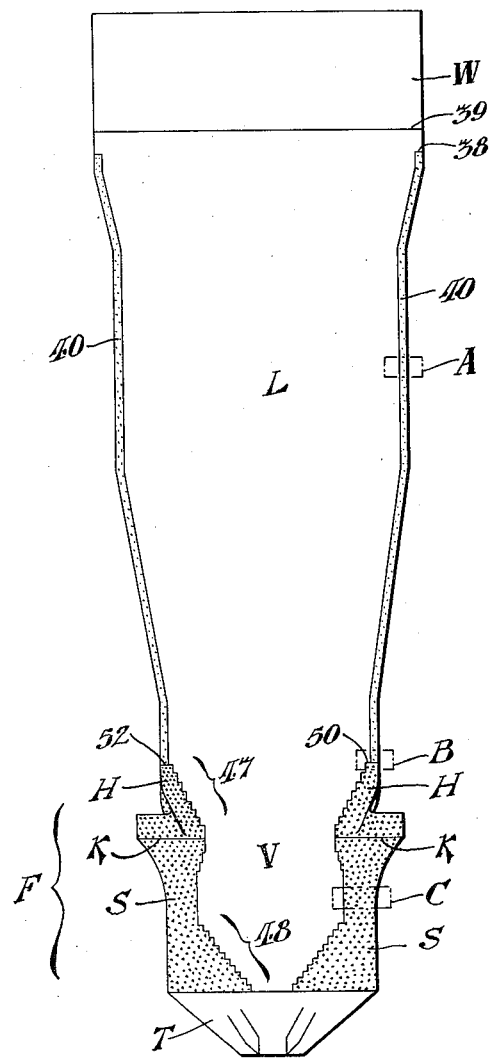
Fig. 2 is a view, on a slightly smaller scale, of the blank from which the stocking of Fig. 1D is formed.
Figure 9:
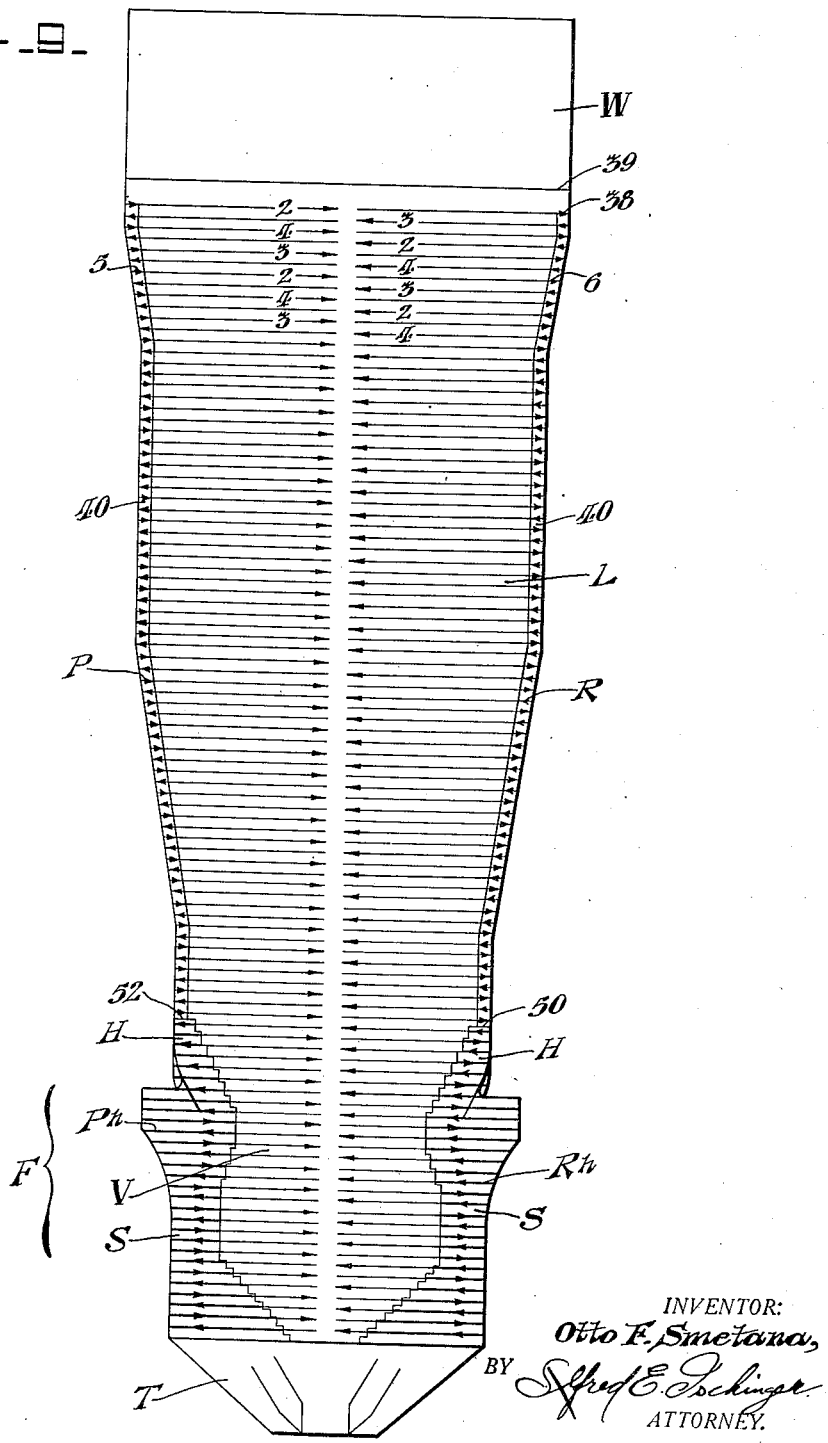
Fig. 9 is a view of a stocking blank indicating diagrammatically the order of laying the courses thereof in accordance with the invention.

Referring to Fig. 2, showing the blank from which the stocking of Fig. 1D is formed, the method of producing the fabric comprises knitting the felt W in successive courses, preferably from a single yarn, as by a single carrier of a knitting machine hereinafter set forth, preferably to the position of a course 38 slightly beyond a welt line 39, from which position, in accordance with the invention, selvage-edge margins 40, constituting strip or ribbon-like areas, are knitted along the edges of the leg blank L to the first courses 50 and 52 of the heel portions H, at the right and left-hand sides, respectively, as shown in Figs. 2, 9 and 10.

The main body fabric of the leg L, from the course 38 and through the instep V to the toe portion T, is preferably knitted in accordance with the now well-known "ringless" principle, by which three separate threads X, Y and Z of the same gauge or size, color and material or texture, are laid in recurrent sequence; this operation, as above stated, since each course of each thread constitutes only every third course of the fabric, causing each selvedge-edge loop between successive courses of the same thread to be much larger than the corresponding loops of a single-thread fabric, and also to overlap the selvedge-edge loops of the threads in the two next-adjacent courses in a comparatively loose or floating formation, as compared to a single-thread fabric. If any continuous fabric therefore, such as the leg L, be knitted solely as a "ringless" area, it will have selvedge edges of the above-mentioned loose, or floating formation, such that, if allowed to remain as the complete or finished edge, will not have as good appearance or be as well protected against damage by snagging or breaking the enlarged edge loops. Where employed in a seam, as in the leg seam portion 36, these loose three-thread edge loops arrange themselves into more or less irregular or locally "bunched" form, such as to be difficult to sew into a seam, and to render the seam unattractive in appearance, and uncomfortable to the wearer.

In accordance with the invention, the margins are preferably knitted from single threads of the same weight as the body thread, altho thread of different weight, or any suitable number of threads, may be employed in one or both margins to advantage for the purposes herein stated, such that the main body of the "leg" fabric has, in general, the "ringless" character, and its selvedge edge areas are of a reduced number of threads to facilitate seaming, and to overcome the objections as to appearance and comfort above stated. Since, in a major aspect, the invention comprises the joining of areas knitted, respectively, from "different" numbers of threads, by a split seam, and in which at least one of the areas is of the "ringless" character or construction, it is contemplated that, for design or other purposes, the above arrangement of knitted areas may be reversed, such that the main or other area or areas are of "single" or other arrangement of yarns and the edge margin or other area or areas are of the "ringless" type. Also, the "ringless" and other area or areas may be intermingled and connected by split seams for fanciful or utility purposes.

In the illustrated example of Figs. 1D and 2 however, the above-mentioned loose formation of the three-thread selvedge edge is obviated, and neat, uniform single-thread marginal areas produced. These leg margins 40, being preferably of the "same" thread, thereby render the leg seam neater in appearance, easier to sew and more comfortable to the wearer.

Figure 3:
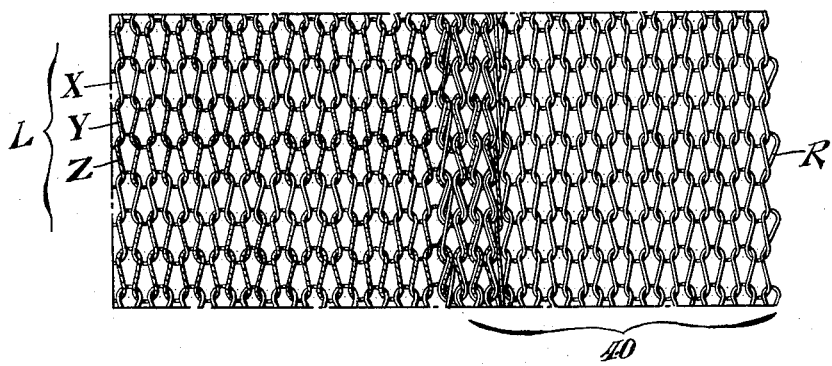
Figs. 3, 4 and 5 are enlarged detail views of the fabric located in the areas indicated by the broken-line rectangles A, B and C, respectively, of Fig. 2.

In the leg, see also Fig. 3, the margins 40 preferably maintain the same width throughout, or, in other words, are "fashioned" with the stocking.

Figure 4:
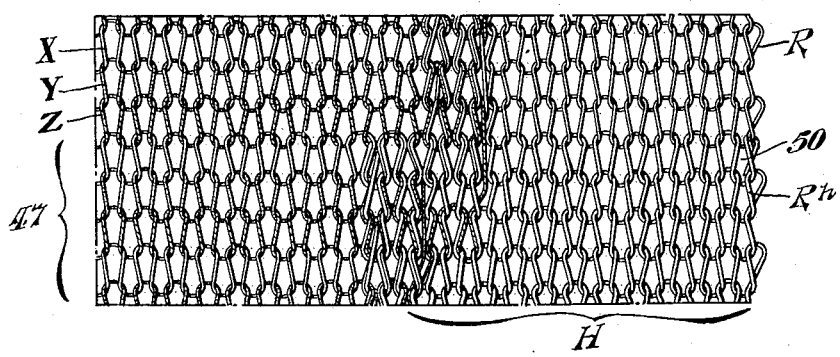

In the areas 47 and 48, see Figs. 2 and 4, in which the three-thread courses are shortened at each end, all of the courses are stepped inwardly, by a distance, such as two needles. That is, the instep area is so stepped in at each end, while the selvedge courses are each stepped in at the inner end, at recurring positions, such as every two to six courses, depending upon the shape desired or other conditions, at which position, one of which is illustrated in Fig. 4, a special operation is effected, as also indicated diagrammatically in Fig. 10. As indicated in Fig. 10, the last selvedge course $w$ of the margin 40 at the left-hand side of the blank is in line with the last "three-thread" courses and with the first heel selvedge course 50 at the right-hand side; the first left-hand heel selvedge course 52 thereby being one course removed from the right-hand heel selvedge course 50, and the courses $w$, $s$ and 50 being laid right to left, as indicated by arrows. The next "three-thread" course $t$ is laid from the previous left-hand starting position of the like courses in the leg area to a stopping position, beginning the instep area, two needles short of the previous stopping position of the "three-thread" courses at the right in the leg area. Consequently, since the course $t$ is not shortened at its left end, and the thread of the selvedge course $w$, which will next be the course 52 laid to the right, with the course $t$, the selvedge course 52 is in proper position for lengthening by two needles to loop into the adjacent end of the course $t$. However, since at the course $t$, the next course $v$ from the thread of the selvedge course 50 is laid from left to right, if it were maintained at the length of the selvedge courses in the leg area, it would fail to loop into the course $t$. To avoid this failure, the course 50, which is laid to the left with the courses $s$ and $w$, is, at its inner or left end, laid by an additional distance of two needles, indicated by a length of thread $z$. Thus, the selvedge course 50 is lengthened inwardly by two needles one course in advance of the shortening of the course $t$ and the lengthening of the course 52, after which all of the courses proceed at the new lengths until a similar operation is performed.

In knitting the stocking from the course 38, at the top of each edge margin, to the positions of the courses 50 and 52 at the tops of the heel areas, all of the carriers are preferably laying thread of the same quality, gauge, weight and color such that, altho the main body of the fabric is "ringless," it has edge margins providing the advantages of the single-thread edge.

Figure 5:
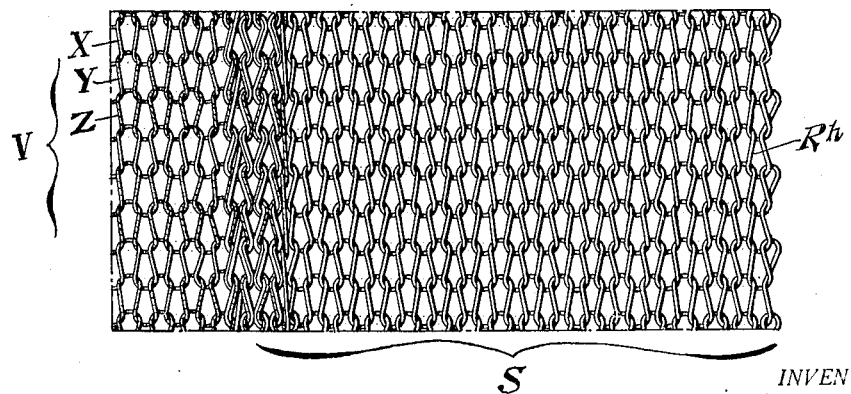

Altho the three-thread courses are continued through the instep V to the toe portion T, at the first selvedge courses of the heel areas H, the silk selvedge course threads P and R are discontinued, and heavier threads P*h* and R*h* substituted to form the reinforced heel and sole portions, as indicated in Fig. 5, and by the weight of the light lines of the margins 40 in Fig. 10, changing to the heavier lines in the heel area H.

During the knitting of the instep and sole, since the instep V is rendered of greater width along a predetermined length, indicated in Fig. 2, an effect between the instep and sole thread occurs at each lengthened course of the instep similar to the above-described course-shortening step between the leg and its margin which, if not similarly compensated for, would likewise leave an opening in the fabric. This defect is avoided however and the fabric rendered solid throughout, as indicated in the diagram of Fig. 11. In this case, instead of carrying one of the selvedge courses an extra distance of two needles, as where the three-thread body courses are shortened as above set forth, since the instep courses are being lengthened, the selvedge courses will be shorter, but they are not both shortened at the first lengthened course of the instep. Instead, when the first lengthened course *r* of the instep is effected, one of the selvedge courses *y* is merely allowed to remain at the same length as before, immediately after which it is shortened.

In the foot, the sole portion provides for the instep single-thread margins having the seaming advantages of the leg margins, but, unlike the leg margins, having walewise outer edge or seam contour different from the inner or "split seam" edge contour next to the instep.

Figure 5A:
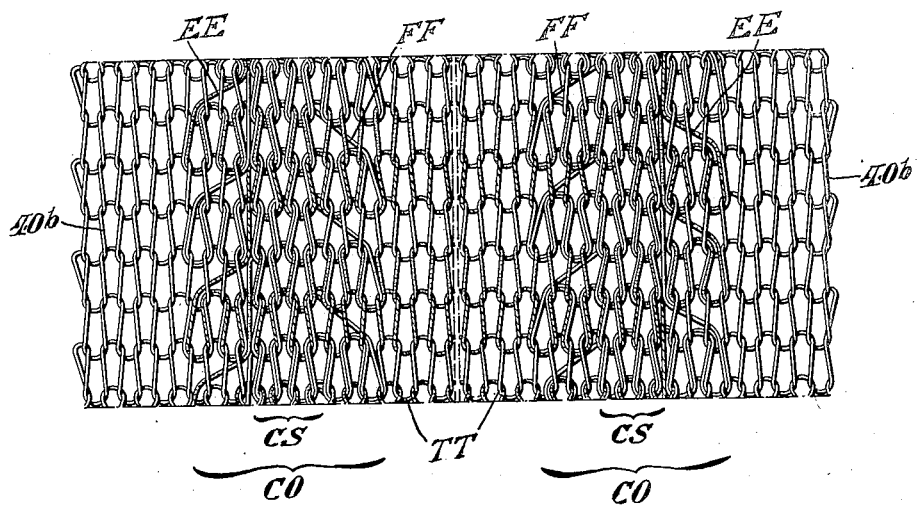
Figs. 5A and 5B are enlarged detail views of modified forms of the fabric illustrating the introduction of open split seam stitches into the closed split seam areas to render the latter more flexible.

In the modification of the invention illustrated in Fig. 5A, showing both selvedge edge margins 40*b* of a stocking blank, each of the three-thread carrier courses TT, after being laid through the closed split areas CS, is extended to form an open-split seam between the closed split seam and the plain loop single-thread area 40*b* for an additional two-needle distance, into the adjacent single-thread margin area 40*b*, as indicated by extensions EE. Also, each single-thread course of the margins 40*b*, after being laid through the adjacent closed split area CS, is extended to form an open-split seam between the closed split-seam area and the plain-loop three-thread area TT for an additional distance of two needles into the adjacent three-thread area, as indicated by the extensions FF, thus forming, with the closed-split seam areas CS, areas CO having the characteristics and structure of both the closed and the open split seams. This construction provides the otherwise comparatively rigid closed split seam areas, as in the previously-described figures, with a certain amount of flexibility and softening the fabric at the seam.

Figure 5B:
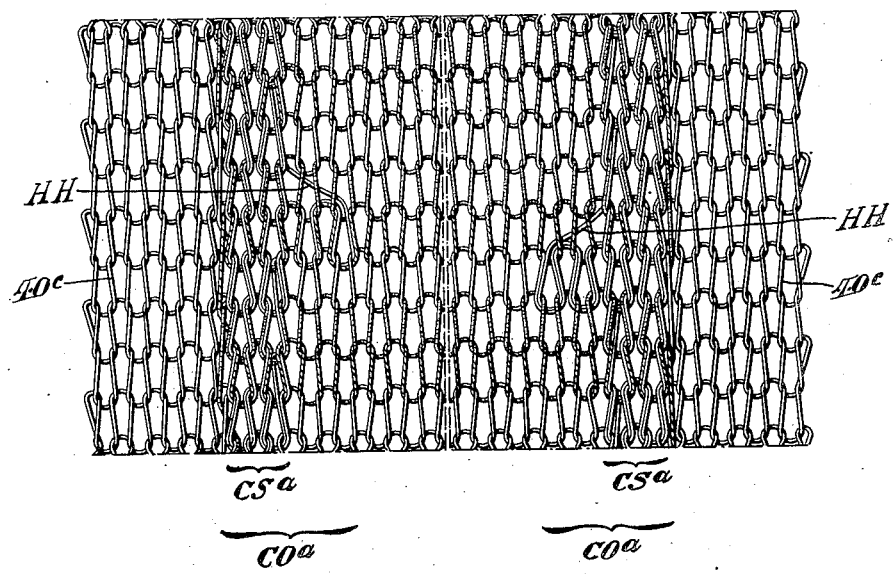

The extended loops EE and FF may be rearranged in various combinations such that they are not provided in every course, but are provided in every other course, or every fourth course, or one of them is omitted or the extensions at the opposite margins may be staggered walewise relative to each other, an example of another arrangement like this being illustrated in Fig. 5B.

In Fig. 5B, in the given walewise length of fabric shown, none of the three-thread courses is extended beyond the closed split-seam areas into the single-thread margins 40*c*, and only one of each of the single-thread margin courses of each margin is extended beyond the closed split seam to form the open-split stitch HH, this structure superimposing the combined closed-open split seam area CO*a* on the closed split seam area CS*a*. Also, in this figure the extensions HH are staggered walewise by one course with respect to each other. The open-split seam stitches, in this form of the invention, may be extended from the three-thread area into the single-thread area, or from the single-thread area into the three-thread area, in various combinations.

In the stocking of Fig. 1, the welt W, and the leg L, from the welt line 39 to the course 38, are of single-thread formation. The leg, from the course 38 to the foot F1, and through the instep V, is of multi-thread ringless form having the single-thread margin 40 joined to the leg body by split seams and extending to a heel area H1 preferably, and as shown in this instance, of double-ply character. The toe T1, and the sole S1, also, in this instance, are preferably constituted like the heel, of two plies. The heel H1 and the sole S1 are joined by suture seams K1.

In the stocking of Fig. 1A, the welt W and the leg L1 may be of the single and multiple-thread form, as above described as to other figures, but without the marginal areas 40 thereof. In this form, the heel area H2 is preferably a single-thread area of heavier form, joined to the coursewise adjacent areas by split seams and to the sole S2 by suture seams K2; the sole S2 and the toe T2 being preferably of usual plated character, in the foot F2.

In the stocking of Fig. 1B, the welt W and the leg L1 are of single and multiple-thread character, as above set forth, without the seam margins 40; the heel H3 being preferably a double-thread plated area, the sole S3 a single-thread area joined to the instep V by split seams, the heel and sole areas being joined to each other by suture seams K3, and the toe T3 of usual reinforced character, in the foot F3.

In the stocking of Fig. 1C, the welt W, the leg L and the margins 40 are as above set forth, with the heel H4 and the sole S4 of different weight thread, joined to the leg and instep, respectively, by split seams, and to each other by suture seam K4, and the toe T4 of usual reinforced character, in the foot F4.

In any of the forms, the heel, sole and toe areas may be of single ply thickness, or of any other suitable number of plies, of yarn that is heavier or stronger for reinforcement, or of yarn of any other character as to wearing quality, color, texture or sense of touch, either as related to, or independently of, the other parts of the stocking.

In the stocking of Figs. 1D and 2, the seam portion 35, in the welt W, may be of ordinary character, as between the edges of an area knitted from a single thread throughout. The seam portion 36 is like the seam portion 35, but is between a uniformly wide single-thread margin and a multi-thread "ringless" portion, and the seam portion 37 is also like the seam portions 35 and 36, but between a shaped reinforcing area of heavier thread and a shaped "ringless" foot portion, as better seen in Fig. 5.

In the modified form of the stocking blank of the invention, shown in Figs. 6 and 8, the leg L is of three-thread formation from the course 38 to ravel courses 51, which are preferably of single-thread formation. The leg L has heel tabs H*a* each simultaneously knitted from two threads, see Fig. 8, forming a reinforced area having split seam attachment to the leg. The single-thread margins are also provided in this form from the course 38 to a course 50*a*.

In the blank of Fig. 7, the leg L*b* and the instep V of the foot F5 are of the above-described three-thread construction, the sole portions S of single-thread formation, and the toe T of double-thread fabric, indicating that a variety of combinations may be produced from the invention.

A machine for producing the above-described fabric by the method set forth, is indicated in Figs. 12 to 50, inclusive, in which, for clearness, only the parts necessary to a full and complete understanding of the invention are shown, the various other parts and mechanisms, and the manner of operation thereof, being well known in the art, and shown and described in detail in the "Reading" Full Fashioned Knitting Machine Catalogue, copyright 1929, published by the Textile Machine Works, Reading, Pennsylvania.

Referring particularly to Figs. 12, 13, 14 and 15, the machine comprises, in general, a base or framework including a front rail 55, a back rail 56, a front bed 57 and a center bed 58, which are joined by end and intermediate frames 60, a cam shaft 62 supported along the frames 60, carrier rods 1 to 7, inclusive, narrowing carriages G at the left and right-hand ends of the machine, as viewed from the front, cam-and-lever assemblies 64 and 65 for operating the narrowing carriages G from the cam shaft, narrowing-lift cam-and-lever assemblies 66 associated with the narrowing carriages G, shogging cams 67 for the cam shaft 62, a friction rod 68, a slur-cock bar 69, a main carriage structure M, a cam-and-lever assembly 70 for operating the carriage structure M from the cam shaft, an auxiliary carriage structure N, a cam-and-lever assembly 71 for operating the carriage N, a selector mechanism U for connecting the carrier rods to, and disconnecting them from, the friction rod 68, a cam-and-lever assembly 72 for operating the selector mechanism U, a needle-bar and sinker-head, or knitting mechanism, assembly I, a cam-and-lever assembly 73 for operating the presser bar from the cam shaft, a cam-and-lever assembly 74 for operating the needle bar from the cam shaft, and a pattern device or chain-motion mechanism Q for controlling the other parts to operate in predetermined sequence.

Also, in general, the above generally-described machine, operates, in knitting the stocking of Figs. 1D and 2, to reciprocate the three-thread carrier rods 2, 3 and 4 in recurring sequence, and both of the carrier rods 5 and 6 simultaneously with the laying of each course by the carriers of the rods 2, 3 and 4. One of the rods 1 or 7 may be employed in the knitting of the welt before starting the above-mentioned operation of the rods 2, 3, 4, 5 and 6.

The rods 2, 3 and 4, Fig. 24, are provided with thread guides 2a, 3a and 4a, respectively, that receive and control the individual knitting threads X, Y and Z, which are drawn by the guides from separate yarn cones $X^1$, $Y^1$, and $Z^1$, through usual tensioning and moistening devices. The selvedge yarns P and R are drawn by similar guides from yarn cones $P^1$ and $R^1$, respectively. The cones and carrier fingers for the courses P$h$ and R$h$ are not shown.

In operating the rods 2, 3 and 4, the selector mechanism U is actuated by the cam shaft, through its cam-and-lever assembly 72, to connect and release the rods 2, 3 and 4 to the friction rod 68 in recurring sequence, so that they will each, when so connected to the friction rod, operate as by an ordinary friction-box connection; this being done to avoid the excess friction that would be created by merely holding two of the rods 2, 3 and 4 against operation while operating the third.

In narrowing, as along the leg of the blank of Fig. 2, the rods 5 and 6 always travel the same distance, the carriage M carrying stops for the rods 2, 3 and 4, and the rods 5 and 6 operating between the usual end stops on the carriages G and stops on the carriage M.

It is to be understood that the machine may be a legger, a footer or a machine for producing an entire stocking, since the essential changes are the same in any of these machines for adapting it to the invention.

In the foot, the operation is essentially like that in producing the leg, the only difference being in the use of different thread and the varied distances between the stops controlling the thread carriers.

*The selector mechanism*

The selector mechanism U is not per se a part of this invention, being claimed in a copending application of Gustav Gastrich, Serial No. 677,443, filed June 24, 1933, for Yarn feeding mechanism for straight knitting machines, which application is owned by the assignee hereof. As parts of this mechanism, see Figs. 17 and 18, the rods 2, 3 and 4 are provided with lugs or dogs 12, 13 and 14, respectively, by which they are selectively and automatically operatively connected to a friction box 75 for reciprocation by the friction rod 68. The box 75, altho of special construction for cooperation with the dogs 12, 13 and 14, as herein appears, is also adapted for operation as a usual friction box in a series of usual boxes 76, Fig. 13, for manual connection to, and release from, one of the carrier rods. Each of the dogs 12, 13 and 14 comprises a pair of lugs 82 spaced along the rod to provide a recess therebetween for the reception of one or the other of a pair of selector fingers 83 and 84 which are formed on, and project from, the lower end of a plunger head 85 that is slidably mounted in the lower end of a rod selector rocker element 86. The head 85 is provided with a stem 89 which is slidably mounted in the selector or rocker 86. The head 85 and the fingers 83 and 84 are adapted for sliding movement in the rocker 86 relative to the carrier rods 2, 3 and 4 for effecting engagement and disengagement of the fingers, being maintained in the desired position by a spring-pressed detent 90, which is carried by the rocker 86 and adapted to enter notches spaced along the stem 89.

The selector rocker 86 is mounted for pivotal movement on, and relative to, the friction box 75 on a short shaft 93 which is secured to the selector by a set screw 94, with the ends of the shaft extending in opposite directions from the opposite sides of the selector, and pivotally-mounted bearings 97 on arms 98 which are integral with, and extend laterally from, one side of the friction box 75.

The arms 98 are also provided with a second pair of bearings 99 which embrace, and are adapted to be moved along, a selector shaft 100. The shaft 100 extends parallel to the friction rod 68, and to the carrier rods 1 to 7. The shaft 100 is rotatably journaled in bearings 105, Figs. 22 and 23, on adjustable brackets 106, each of which is pivotally mounted on a bushing 107 that is carried in, and extends laterally from, a bearing 108 on the end of a bracket 109 fixed to the machine frame. The bushings 107, in addition to providing pivotal mountings for the adjusting bracket 106, provide slidable bearing means for the friction rod 68.

Figure 22:
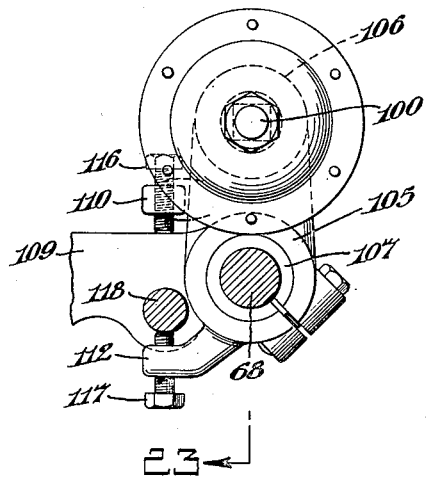
Fig. 22 is a view, taken substantially along the line 22—22 of Fig. 13, illustrating means for preventing drift of the selector shaft.
Figure 23:
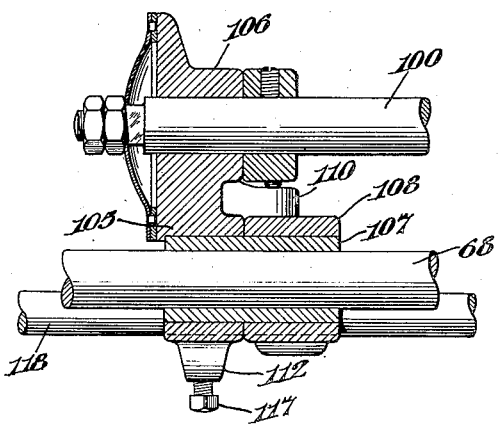
Fig. 23 is a view taken substantially along the line 23—23 of Fig. 22.

Each adjustable bracket 106, Fig. 22, is provided with a pair of arms 110 and 112, in the outer ends of which are disposed threaded adjusting screws 116 and 117, respectively. The screw 116 bearing against the upper surface of the rigid bracket 109, and the screw 117 bearing against the underside of a friction box guide rod 118, which is secured in, and extends between, the rigid brackets 109, parallel to the friction rod 68, the brackets 106 may thereby be adjusted about the axis of the rod 68 for aligning the selector shaft 100 longitudinally relative to the bearings 99 carried by the friction box 75.

Adjacent to the bearings 99, Fig. 17, selector cams 120 and 121 are severally provided with sleeve-like hubs 122, which are splined to the shaft 100 and rotatably mounted in the adjacent bearings 99. Each sleeve 122 extends beyond the opposite side of the bearing, at which its particular cam is located, and is provided with a collar 123, secured thereto adjacent to its outer end, to prevent axial movement between the bearing and the cam, whereby, under longitudinal reciprocation of the friction box 75, the cams will accordingly be reciprocated relative to the selector shaft 100, during each reciprocation of the friction box 75, as it effects longitudinal movement of one of the carrier rods 2, 3 or 4, through the selector 86, and fingers 83 and 84, to lay the thread controlled by the guide 2a, 3a or 4a thereon to needles 125 of the knitting mechanism I for the formation of a single course of loops.

At the end of each needle-traversing stroke of reciprocating movement of the friction box 75, the selector shaft 100 is rotated through an angle of 60°, whereby the carrier rod previously moved by the friction box is released therefrom, and whereby an operative connection is established between the friction box and another carrier rod, depending upon the position to which the selector 86 on the friction box 75 is moved by the above-mentioned partial rotation of the shaft 100.

The intermittent 60° turns of the selector shaft 100, cause the cams 120 and 121 to move the rocker 86 about the pivot to release the finger 83 or 84 from the next preceding operative carrier rod, and to engage one of the fingers to the dog of the carrier rod next to be actuated.

The selective turning of the rocker 86, by the cams 120 and 121, is effected through rollers 126 and 127 which are, respectively, engaged by the cams 120 and 121, the rollers 126 and 127 being rotatably mounted in angularly-spaced relation to each other, and to the axis of the pivot shaft 83 of the rocker 86.

Figure 20:
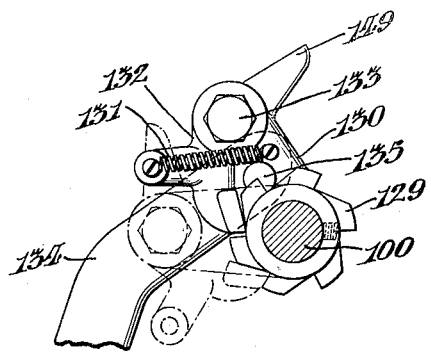
Fig. 20 is a view, taken substantially along the line 20—20 of Fig. 13.
Figure 21:
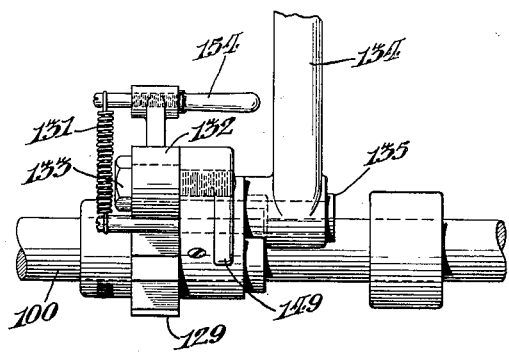
Fig. 21 is a top plan view of, and at right angles to, the structure of Fig. 20.

The intermittent 60° turns of the selector shaft 100 are effected by mechanism shown in Figs. 20 and 21, in which the selector shaft 100 has secured thereto a ratchet wheel 129. A pawl carrier 130 is pivotally mounted on the shaft 100 adjacent to the ratchet wheel 129. A pawl 132 is pivotally mounted on a pin 133 in the pawl carrier 130. The pawl 132 is normally held in engagement with the ratchet wheel 129 by a spring 131 having one end secured to the pawl, and its opposite end secured to the pawl carrier 130.

A link 134 is pivotally mounted, at one end, on a pin 135 in the pawl carrier 130 and, at the opposite end, Fig. 14, is pivotally connected, by a pin 136, to one arm 137 of a lever 138. The lever 138 is pivotally mounted on a pin 140 in a bracket 141 that is secured to the back rail 56. A second arm 142 of the lever 138 is provided with a cam follower roller 143 for engagement with the periphery of a cam 144 that is secured to the main cam shaft 62. A tension spring 146 is connected between a hook 147 on the lever 138 and a bracket 148 on the back rail 56 for biasing the follower 143 against the cam 144. The shaft 62 is adapted to be shogged axially to effect narrowing of the fabric by causing inward transfer of groups of stitches adjacent to each of the selvedge edges of the fabric, during which time the thread carrier rods remain idle. In order to prevent disruption of the predetermined order in which the thread carriers are to be operated, shogging of the shaft 66 moves the cam 144 from under the roller 143 and moves a substantially circular disc 145 into alignment with the roller, whereby rotation of the shaft 62, while shortening the courses, does not effect rotation of the selector shaft 100.

The pawl 132 is provided with a handle 154 by which, at such times as it may be desirable to knit a plurality of successively interlooped courses of a single thread fed to the needles by a single carrier rod, the pawl may be moved out of operation relative to the ratchet wheel 129, in which case the pawl 132 is turned about its pivot 133, until the handle 154 of the pawl rests against a lug 149 on the pawl carrier 130. During the movement of the pawl, the spring 131 moves across the center of the pivot pin 133 of the pawl, and holds the handle 154 against the lug 149 to prevent engagement of the pawl with the ratchet wheel 129.

End-stop carriage mechanism

The end stop devices G are similar, and of usual character, each comprising a narrowing carriage or nut 150 on a screw 151 and carrying usual end stops 152 and 153, respectively, which are moved longitudinally inwardly of the rods, when transferring stitches, the screws being actuated, in a usual manner, through the cam-and-lever assembly 64 or 65, when the shaft 62 is shogged axially.

When knitting the leg of the stocking of Figs. 1D and 2, having the single-thread edge on the three-thread main area, the carrier rods 5 and 6, which carry the guides 5a and 6a to lay the single-thread edge courses, will be the only rods directly engaging stops on the devices G, the carriers 2, 3 and 4, at this time, operating between intermediate stops carried by the carriage mechanism M, and the carriers 1 and 7 being out of service.

Intermediate stop carriage mechanism

The intermediate stop carriage mechanism M, see Figs. 12, 15, 32, 33 and 39 to 44, inclusive, comprises nuts 155 and 156 oppositely movable along a screw 157 having reverse-screw portions 158 and 159, respectively, on which the nuts are mounted. The nuts 155 and 156 have arms 162 and 163, respectively, that are slidably mounted on a back narrowing shaft 167 for guiding thereby, and arms 168 and 169, respectively, the arm 168 of which carries stops 2c to 6c, respectively, for cooperation with the rods 2 to 6, and the arm 169 of which carries stops 2d to 7d, respectively, for cooperation with the rods 2 to 7. The screw 157 is mounted in bearing brackets 170 and 171 disposed on a support 172 secured to the machine frame.

The above-mentioned c stops for rods 2 to 7, respectively, are each in the form of an elongated plunger slidably guided in the arm 168, and including a handle 173. Spring biased ball detents 174 in the arm 168 are arranged to cooperate with notches in the stops c to accentuate, or yieldingly hold, the same in raised or inoperative position.

The rods 2, 3 and 4 operate the three-thread carriers 2a, 3a and 4a, respectively, and carry detents 2i, 3i and 4i to be stopped, each at one end of a stroke, by the stops 2c, 3c and 4c. Similarly, the d stops for rods 2 to 7, respectively, are each in the form of a plunger slidably guided in the arm 169, the stops 2d, 3d and 4d of which are adapted to engage detents 2j, 3j and 4j, carried by the rods 2, 3 and 4, respectively.

The stops c and d act merely as ordinary stroke limiters for the corresponding rods and are adjusted automatically, as controlled by the chain motion mechanism Q, and as actuated by the cam shaft 62, through the cam-and-lever assembly 70, which is connected to the nuts through ratchet wheels 175 and 176 fixed to the end of the screw 157. These wheels 175 and 176 cooperate with pawls 177 and 178 to rotate the screw, step by step in the same direction or alternately in opposite directions, the pawls having flanges 182 and 183, respectively, engageable by fingers 184 and 185 at the upper end of a lever 186, which is moved alternately to bring one or the other of the fingers into engagement with the flange of its cooperating pawl to prevent it from coaction with its respective ratchet wheel at a time when the pawls are simultaneously shifted.

The pawl 177 is mounted on a lever 180 which is fulcrumed on the screw 157 and adjustably connected, by a link-and-lever connection 187, 188 and 189, to a similar lever 190, which carries the pawl 178, and is likewise pivotally mounted on the screw 157. Thus, the pawls are connected to move in unison, only one being active at a time, and are actuated by a rod 195 connected to a lever 196 fulcrumed on a bearing 197, and carrying a roller 198 engaging a cam 199 on the shaft 62. One end of the lever 196 rests on the shouldered end of a lever 200, which is operated by the pattern chain mechanism Q including actuating buttons 201 and 202. The low buttons 201 are provided on the chain for moving the lever 200 sufficiently to disengage its upper end from the lever 196, thereby allowing the roller 198 to engage the cam 199 and coact therewith to cause the active pawl 178 to move its ratchet wheel 176, and consequently, turn the screw 157 a step in one direction. When the button has passed, a tension spring 207 returns the lever 200 for engagement with the lever 196, and retains it in inactive position after the revolution of the cam 199.

High buttons 202 are provided on the chain to move the lever 200 an increased amount thereby allowing the cam 199 to operate as before, but increasing the movement of the lever 200 to cause its upper end to engage a lever 209 to shift the same, by a spring 210, to the position shown. The lever 209 is fulcrumed on a pin 212 and connected to the lower end of the lever 186 by a rod 214, which moves the lever to disengage the finger 184 from the flange 182 on the pawl 177, and place the finger 185 in active engagement with the flange 183 on the pawl 178. This action allows the pawl 177 to act on the ratchet 175, while the pawl 178 is held inactive during the pawl shift motion derived from the cam shaft 62, causing the screw to be moved a step in the opposite direction. After a high button 202 has passed, the tension spring 207 again returns the lever 209 to its normal position, thereby reversing the connection of the fingers 184 and 185, while the levers 196 and 200 are reset for cooperation with the next button.

*Auxiliary carriage mechanism*

Referring to Figs. 12, 14, 25 and 32 inclusive, 35, 36, 37, 38 and 45 to 50 inclusive, the auxiliary carriage mechanism N is provided to support stops for the single-thread selvedge-edge carriers 5 and 6 at positions remote from the intermediate stops of the carriage M for the three-thread carriers 2, 3 and 4, and to support elements for cooperation with elements carried by the carriers 2, 3 and 4 to automatically hold and release the latter in the sequence of operation selected by the mechanism U, and at the position determined by the stops of the carriage M.

The carriage N, somewhat like the carriage M, also comprises two brackets 215 and 216, see Fig. 32, corresponding to the nuts 155 and 156, but, unlike these nuts, not having screw threaded attachment to any element like the screw 157. Instead, the brackets 215 and 216 are connected to the nuts 155 and 156, respectively, so that, as the latter are moved toward and from each other, the brackets 215 and 216 will also move toward and from each other. The brackets 215 and 216 are slidably mounted on the back narrowing shaft 167, by clamp bases 217, and connected to the arms 162 and 163, respectively, of the carriage M, as by bars 218 and 219, see Figs. 25 and 32. Each clamp base 217, Fig. 25, has a depending arm 222 to which a forked guide 223 is secured for embracing a back catch-bar shaft 224 along which it slides. The brackets 215 and 216 are provided with rectangular plate like portions 225 and 226, respectively, lying in parallel vertical plane relation and having inner surfaces facing each other, and each having a lug or raised portion 227 at each side of its face. At each plate 225 and 226, a bridging member or clamp 230, secured between the lugs of the corresponding pair of the lugs 227, has inner surface guides 231 for holding slidable stops for certain of the carrier rods against the face of each of the plates.

Against the plate 225, one of the bridges 230 holds stops 2p, 3p, 4p and 6f for the carrier rods 2, 3, 4 and 6, respectively. Against the plate 226, the other bridge 230 holds stops 2q, 3q, 4q and 5e for the carrier rods 2, 3, 4 and 5, respectively. As indicated in Figs. 25 to 30, inclusive, each stop, of the p, q, f and e series, is in the form of an elongated bar of rectangular cross section, biased downwardly toward operative position against its corresponding carrier rod, by a spring 233 that is secured, at its upper end, to the stop, and, at its lower end, to a stationary lug 234. The stop 3p, which lies between the stops 2p and 4p, has a hook handle 232, and a pin 235 transversely thereto, cooperating with the stops 2p and 4p, whereby the handle 232 may be manipulated to simultaneously lift the three-thread carrier stops 2p, 3p and 4p. Similarly, the stop 3q has a hook handle 236 and a pin 237 for lifting the stops 2q and 4q, when the stop 3q is lifted. The single-thread carrier stops 5e and 6f have individual hook handles 241 and 242, respectively. An overhanging shoulder or lift element 238 on each of the stops 3p, 6f, 3q and 5e is adapted, in the inoperative or lifted position, to rest on a seat 239 on one of a pair of brackets 243.

The brackets 243, secured along the top edges of the plates 225 and 226, as by screws 244, each support a lever 248 pivoted on a pin 249, and have a bearing bracket 250 for slidable mounting on a shaft 251. The shaft 251 is rigidly secured, by a bracket 252, to the friction-box guide rod 118. The shaft 251 is locked against longitudinal movement to the bracket 252 by collars 262 secured to the shaft by set screws, see Figs. 31 and 32. Levers 254, mounted to turn with, and to slide along, the shaft 251, are each pivotally connected to one end of a link 255, the other end of which is pivotally connected to the corresponding lever 248. A lever 253, mounted to turn with the shaft 251, is pivotally connected to a link or rod 256 for periodic operation from the cam shaft 62, as controlled by the chain motion mechanism Q, through the cam and lever assembly 77, for moving the link 255 between the position thereof indicated in Figs. 25 and 26. In the position of the link 255 shown in Fig. 25, which corresponds to the position of the parts of Figs. 36 and 37, the stop 6f is in position such that its lower end is in the path of movement of a detent screw 6g, Figs. 36, 37 and 38. In the position of the links 255 indicated in Fig. 26, which links 255 are lifted when the rod 256 is moved downwardly, the lift elements 238 on the stops 6f and 5e are engaged by the corresponding links to so lift the stops as to position the lower ends of the stops opposite upper detent screws 6h and 5h, Fig. 38. Since this action occurs only during one stroke of the rods in one direction, in the positions of the parts indicated in Figs. 36, 37 and 38, the stroke of the single-thread selvedge carrier rod 6 will be increased by a distance such as two needles during the last course of an area previous to shortening a main body course and lengthening the selvedge courses. Similarly, if the action occurs during the strokes of the rods 5 and 6 in the opposite direction, the stroke of the rod 5 will be increased, during this one stroke, by a distance, such as two needles, along the needle bank of the machine.

As shown in Figs. 25 and 31, the shaft 251 has a flat side, against which the inner end of each lever 254 is clamped. This inner end is in the form of a split sleeve or bearing having a portion 258 against the rounded part of the shaft, and a bridge piece 259 connected to the portion 258, as by screws 260, against the flat side of the shaft. Thus, the bearings may slide along the shaft, and turn therewith, and have the broad-area flat-key or bridge pieces 259 to prevent binding, as might be the case were usual set screws employed against the flat side of the shaft. Also, each bearing bracket 250, see Fig. 35, is embraced at both sides, along the shaft 251, by portions 261 of one of the bridge pieces 259 such that, when the carriages or brackets 215 and 216 are shifted along the shafts 167, 224 and 251, there will be no imposition of the shifting force on the link and lever pivots carried thereby.

Referring to Figs. 12, 14, 15, 25 and 34, the rod 256, of the cam and lever assembly 77, pivotally connects at its lower end, as by a pin 275, to a lever 276 that is pivotally connected by a pin 277 to a bracket 278 on the back rail 56. A tension spring 280 extends between an arm 281 of the bracket 278 and a hook 282 on the lever 276. A follower roller 283, journaled on a pin 284 in the lever 276, cooperates with a cam 285 on the shaft 62. An arm 286 of the lever 276 is normally held against a lever 287 by the spring 280 so that the follower 283 cannot follow the working contour of the cam 285. The lever 287 is pivotally mounted, as by a pin 290, on a bracket 291 secured to the front rail 55, and is pivotally mounted, as by a pin 292, to a rod 294 that extends to a lever 295 to one end of which it is pivotally mounted by a pin 296. The lever 295 is pivotally mounted on a shaft 297, and has its other end disposed for operation by buttons 298 on a chain 299 of the chain-motion mechanism Q. Thus, when one of the buttons 298 engages the lever 295, the lever 276 is released to follow the contour of its cam, and to actuate, through the cam and lever assembly 77, the links 255 and, with them, one of the selvedge thread stops 5e or 6f, depending upon the number of courses which have been knitted since the next previous narrowing operation. When the button 298 is removed from under the lever 295, and the high spot of the cam 285 engages the follower 283, a spring 301 draws the lever 287 to position over the end 286 of the lever 276 to prevent the follower from following the contour of the cam.

Referring to Fig. 36, the detent screws 6h and 6g for cooperation with the stop 6f, are mounted, as by lock nuts, in a bracket 265 secured to the carrier rod 6 as by rivets. Similarly the single thread selvedge carrier rod 5 carries a bracket 265 for like support of detent screws 5h and 5g for cooperation with the stop 5e which is operated similarly to the stop 6f for effecting the extra two needle movement above set forth.

Referring particularly to Figs. 45 to 50, inclusive, upright sides of the stops 2p, 3p and 4p, adjacent to beveled lower ends thereof, are adapted to engage the ends of combined stop-and-cam members 2k, 3k and 4k, respectively. Similarly the stops 2q, 3q and 4q are adapted to abut against the ends of combined stop-and-cam members 2r, 3r and 4r; each of the combined stop and cam members being in the form of a pair of plates 266, Figs. 25, 26 and 27, clamped, as by screws 267 against a member 268 fixed to the corresponding carrier rod. A screw and lock nut device 269, on a raised portion 270 of each of the members 268, constitutes means for adjusting the positions of the members 2k, 2r etc., which is done by adjusting and setting the screws 269, and then clamping the elements 2k etc. against both the members 268 and the screws 269 by the screws 267.

Cam fingers 2m, 3m and 4m are mounted on the stops 2p, 3p and 4p, respectively, for engagement, respectively, with the cams 4k, 2k and 3k. Cam fingers 2n, 3n and 4n are mounted on the stops 2q, 3q and 4q, respectively, for engagement, respectively, with the cams 4r, 2r and 3r; this arrangement being effected, as indicated in Figs. 27 and 35, by mounting the fingers on the stops they are to lift, and laterally projecting them to have the cam engaging points over, or in line with, the cam by which they are to be lifted. As indicated in Fig. 27, the stop 2q has a shoulder 272 for engagement with a cooperating shoulder 273 on the plate 216 to limit the inward or downward movement thereof. Like shoulders are provided for the stops 3q, 4q, 2p, 3p and 4p, but not for the stops 5e and 6f.

*Operation*

Referring to Figs. 39 to 44, inclusive, the stops 2c, 3c and 4c, and the stops 2d, 3d and 4d are, as above set forth, carried by the mechanism M. For clearness, these stops are grouped in Figs. 39 to 44 with the stops 5e and 6f, which are carried by the mechanism N, and which are only isolated from the first-mentioned stops to prevent jarring thereof by the stops 5e and 6f. The parts of the mechanism M, of Figs. 45 to 50, are not shown in Figs. 39 to 44, since they merely accentuate the rods in the positions to which they are moved and stopped, as indicated in Figs. 39 to 44.

In knitting the stocking of Figs. 1D, 2 and 9, at the conclusion of the knitting of the welt W, and a top portion of the leg to the position 38, in any desired manner, the welt carrier is thrown out of operation and the three thread fingers 2a, 3a and 4a actuated, by effecting operation of the selector mechanism U, as above set forth. At the time the three-thread carriers are thus placed in operation, the single-thread selvedge carriers 5 and 6 are also placed in operation.

Fig. 39 shows the positions of the parts at the end of one course-laying operation, in which one of the three thread courses and both of the single-thread edge courses are laid in unison. In this position, the carrier rods 2, 5 and 6 have just moved from the left to the right. In the next step of Fig. 40, the carrier rod 3 moves from its position, at the right of Fig. 39, to its left-hand limit, in which position its detent 3j engages the stop 3d; the selvedge carriers 5 and 6 also accompanying this stroke of the carrier 3, as limited by the end stop 152 and the stop 6f, respectively, whereby the rod 5 engages the end stop 152, and the lower detent screw on the member 265 of the rod 6 engages the stop 6f. In the step of Fig. 41, the carrier 4 then travels to the right, disengaging its detent 4j from the stop 4d and engaging its detent 4i to the stop 4c. This stroke of the carrier 4 is also accompanied by the selvedge carriers 5 and 6, the carrier 5 disengaging the end stop 152 and engaging its lower detent screw on the member 265 to the stop 5e, and the carrier 6 disengaging its lower detent screw from the stop 6f, and itself engaging the end stop 153. In Fig. 42, the carrier 2 next moves to the left, in doing which its detent 2i disengages the stop 2c and the detent 2j engages the stop 2d. In the step of Fig. 43, the carrier 3 disengages its detent 3j from the stop 3d, and moves to the right, to engage its detent 3i to the stop 3c. In the step of Fig. 44, the carrier 4 disengages its detent 4i from the stop 4c and returns to the left, with its detent 4j against the stop 4d, to position the parts as they will be just previous to assuming the positions of Fig. 39, thus completing a cycle of laying the three-thread in the "ringless" formation, in which the selvedge carriers 5 and 6 both move with each of the three-thread carriers.

As indicated in Figs. 36, 37 and 38, when the above-described additional needle movement of either of the selvedge carriers is required for the one stroke previous to lengthening a body course, the stop 6f and 5e is lifted from its normal position, in which the stop 6f engages the longer lower screw 6g, or the stop 5e engages the longer lower screw 5g. When so lifted, during the laying of one course, the stop 6f or 5e engages the shorter upper corresponding screw 6h or 5h, after which the stop which was raised is lowered to again engage the longer lower screw.

Referring to the sequence diagrams of Figs. 45 to 50, inclusive, Fig. 45 indicates a step or stage in the sequence of operation, corresponding to that of Fig. 39 in which the rods 2, 3, 5 and 6 are at the right-hand ends of their strokes, the rod 4 is at its left-hand position, and the rod 3 is about to reciprocate to the left.

In the position of Fig. 45, the rod 2 has just moved to the right as in Fig. 39, in doing which the cam finger 3m, of the stop 3p, is raised by the cam 2k to release the rod 3 for the above-mentioned movement to the left.

In Fig. 46, the rod 3 has moved to the left, as in Fig. 40, in doing which, the cam 3r raises the finger 4n the release the stop 4q for permitting the rod 4 to move to the right.

In Fig. 47, the rod 4 has completed this movement to the right, as in Fig. 41, and, at the same time, moved its cam 4k against the finger 2m to raise the stop 2p, and to thereby, release the rod 2 for movement to the left.

In Fig. 48, the rod 2 has thus moved to the left as in Fig. 42, and engaged its cam 2r against the finger 3n to lift the stop 3q, and to thereby release the rod 3 for movement to the right.

In Fig. 49, the rod 3 has moved to the right, as in Fig. 43, and engaged its cam 3k to the finger 4m to raise the stop 4p, and to release the rod 4 for movement to the left.

In Fig. 50, the rod 4 has moved to the left, as in Fig. 44, and engaged its cam 4r to the finger 2n to raise the stop 2q, and release the rod 2 for movement to the right, as in Figs. 45 and 39 thus, positioning the parts for a repetition of the cycle above described.

In each of the various positions of the parts in Figs. 45 to 50, inclusive, the stops 2p to 4q, inclusive, are behind their respective cams in the direction of movement of the corresponding rods, thus acting as rebound stops to prevent asynchronization of the sequential movement of the three-thread rods whereby they might get out of step with the sinkers and dividers of the knitting mechanism I.

So long as the three-thread carriers 2, 3 and 4 are operating in the knitting of a straight-edge area, the single-thread selvedge carriers 5 and 6 move the same distances as each other, and in unison with each other, at each stroke of each three-thread carrier, in the same direction, and it is only when it is desired to shorten or lengthen the body courses as above set forth that the selvedge carriers 5a and 6a are moved by an additional distance of two needles.

In view of the above-mentioned operation, when the selvedge carriers 5 and 6 operate at each operation of the three-thread carriers 2, 3 and 4, and in view of the fact that two of the latter carriers are always idle, if the stops 5e and 6f were on the carriage M with the regular stops of the carriers 2, 3 and 4, when the detents on the rods 5 and 6 hit their stops, the idle three-thread carriers would be jarred. By placing the regular stops of the selvedge carriers on the auxiliary carriage N with the rebound stops and cams of Figs. 45 and 50, inclusive, and, since the carriage N is remotely disposed relative to the carriage M and connected thereto by the rods 218 and 219, this jarring action is removed from the two idle three-thread carriers, to ensure their effective operation.

Of course, the improvements specifically shown and described, by which I obtain the above results, can be changed and modified in various ways without departing from the scope of the invention herein disclosed and hereinafter claimed.

I claim:

1. A full fashioned stocking having a central and two side areas joined together by seams in which the threads of said side areas are interknitted to form closed split seams, one of said areas extending greater or less coursewise distances as the other said area extends less or greater distances, a thread of one of said areas extending beyond the average width of one of said seams in one course in one direction from the seam and a thread of one of said areas extending from the other of said seams in the opposite direction from the seam and in the course following said one course, to thereby lessen the rigidity of the closed split seam.

2. A full fashioned stocking having two areas the threads of which are interknitted to form a closed split seam, one of said areas extending greater or less coursewise distances as the other said area extends less or greater distances, a thread of one of said areas extending beyond the average width of said seam in one course in one direction from said seam and a thread of the other of said areas extending beyond the average width of said seam in the opposite direction from said seam and in the course following said one course, to thereby lessen the rigidity of the closed split seam.

OTTO F. SMETANA.